(12) United States Patent
Swartzlander, Jr. et al.

(10) Patent No.: US 7,543,010 B2
(45) Date of Patent: Jun. 2, 2009

(54) MODULAR PIPELINE FAST FOURIER TRANSFORM

(75) Inventors: Earl E. Swartzlander, Jr., Austin, TX (US); Ayman Moustafa El-Khashab, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 840 days.

(21) Appl. No.: 10/979,775

(22) Filed: Nov. 2, 2004

(65) Prior Publication Data

US 2005/0160127 A1   Jul. 21, 2005

Related U.S. Application Data

(60) Provisional application No. 60/516,894, filed on Nov. 3, 2003.

(51) Int. Cl.
G06F 17/14 (2006.01)

(52) U.S. Cl. ........................................ 708/404; 708/409

(58) Field of Classification Search .......... 708/400–409
See application file for complete search history.

(56) References Cited

U.S. PATENT DOCUMENTS

| | | | |
|---|---|---|---|
| 3,965,342 A | 6/1976 | Constant | |
| 4,085,441 A | 4/1978 | Fagan | |
| 4,139,897 A | 2/1979 | Gardner et al. | |
| 4,534,009 A | 8/1985 | McGee | |
| 4,547,862 A | 10/1985 | McIver et al. | |
| 4,689,762 A | 8/1987 | Thibodeau, Jr. | |
| 4,763,290 A | 8/1988 | Cowen | |
| 5,028,877 A | 7/1991 | Muller et al. | |
| 5,038,311 A | 8/1991 | Monastra et al. | |
| 5,163,017 A | 11/1992 | Wong et al. | |
| 5,293,330 A | 3/1994 | Sayegh | |
| 5,365,470 A | 11/1994 | Smith | |
| 5,430,667 A | 7/1995 | Takano | |
| 5,491,652 A | 2/1996 | Luo et al. | |
| 5,890,098 A * | 3/1999 | Kozaki et al. | .................. 702/77 |
| 6,035,313 A | 3/2000 | Marchant | |
| 6,081,821 A | 6/2000 | Hopkinson et al. | |
| 6,115,728 A | 9/2000 | Nakai et al. | |
| 6,247,034 B1 * | 6/2001 | Nakai et al. | .................. 708/409 |
| 6,330,580 B1 | 12/2001 | Giaume et al. | |
| 6,430,587 B1 | 8/2002 | Orling | |

(Continued)

OTHER PUBLICATIONS

Ayman M. El-Khashad and Earl E. Swartzlander, Jr., "An Architecture for a Radix-4 Modular Pipeline Fast Fourier Transform," IEEE International Conference on Application-Specific Systems, Architectures, and Processors, Jun. 24-26, 2003, pp. 378-388.

(Continued)

Primary Examiner—Tan V Mai
(74) Attorney, Agent, or Firm—Shumaker & Sieffert, P.A.

(57) ABSTRACT

A modular pipeline algorithm and architecture for computing discrete Fourier transforms is described. For an N point transform, two pipeline $\sqrt{N}$ point fast Fourier transform (FFT) modules are combined with a center element. The center element contains memories, multipliers and control logic. Compared with standard N point pipeline FFTs, the modular pipeline FFT maintains the bandwidth of existing pipeline FFTs with reduced dynamic power consumption and reduced complexity of the overall hardware pipeline.

15 Claims, 18 Drawing Sheets

U.S. PATENT DOCUMENTS

| | | | |
|---|---|---|---|
| 6,434,583 | B1 | 8/2002 | Dapper et al. |
| 6,477,554 | B1 | 11/2002 | Aizenberg et al. |
| 6,490,672 | B1 | 12/2002 | Aizenberg et al. |
| 6,549,925 | B1 | 4/2003 | Amrany et al. |
| 7,164,723 | B2* | 1/2007 | Sunwoo ............... 375/260 |
| 2004/0128334 | A1* | 7/2004 | Schuepbach ............ 708/409 |

OTHER PUBLICATIONS

Ayman M. El-Khashad and Earl E. Swartzlander, Jr., "A Modular Pipelined Implementation of Large Fast Fourier Transforms," The Thirty-Sixth Asilomar Conference on Signals, Systems & Computers, Nov. 306, 2002, pp. 995-999.

Steven M. Currie et al., "Implementation of a Single Chip, Pipelined, Complex, One-Dimensional Fast Fourier Transform in 0.25 um Bulk CMOS," The IEEE International Conference on Application-Specific Systems, Architectures, and Processors, Jul. 17-19, 2002, 335-343.

Earl E. Swartzlander, Jr., "VLSI Signal Processing Systems," Chapter 6, Kluwer Academic Publishers, 1986, pp. 117-139.

Herbert L. Groginsky and George A. Works, "A Pipeline Fast Fourier Transform," IEEE Transactions on Computers, vol. C-19, No. 11, Nov. 1970, pp. 1015-1019.

Ben Gold and Theodore Bially, "Parallelism in Fast Fourier Transform Hardware," IEEE Trans. Audio Electroacoust., vol. AU-21, pp. 5-16, Feb. 1973, pp. 549-560.

M. Hasan and T. Arslan, "Scheme for reducing size of coefficient memory in FFT processor," *Electronics Letters*, vol. 38, No. 4, pp. 163-164, 2002.

B.C. McKinney and F.E. Guibaly, "A multiple-access pipeline architecture for digital signal processing," *IEEE Transactions on Computers*, vol. 37, No. 3, pp. 283-290, 1988.

J.W. Cooley and J.W. Tukey, "An algorithm for the machine calculation of complex Fourier series," *Math Comput.*, vol. 19, pp. 297-301, 1965.

D. Cohen, "Simplified control of FFT hardware," *IEEE Transactions on Acoustics, Speech, and Signal Processing*, vol. ASSP-24, pp. 577-579, 1976.

E.E. Swartzlander, Jr., "High speed micro signal processor study," Tech. Rep. AFAL-TR-77-63, Air Force Avionics Laboratory, Air Force Systems Command-Wright-Patterson AFB, pp. 1-145, Mar. 1977.

D.L. Jones and H.V. Sorensen, "A bus-oriented multiprocessor fast Fourier transform," *IEEE Transactions on Signal Processing*, vol. 39, No. 11, pp. 2547-2552, 1991.

S. Yu and E.E. Swartzlander, Jr. "A pipelined architecture for the multidimensional DFT," *IEEE Transactions on Signal Processing*, vol. 49, No. 9, pp. 2096-2102, 2001.

G. Szedo, V. Yang and C. Dick, "High-performance FFT processing using reconfigurable logic," *Conference Record of the Thirty-Fifth Asilomar Conference on Signals, Systems and Computers*, vol. 2, pp. 1353-1356. 2001.

B.M. Baas, "A low-power high-performance 1024-point FFT processor," *IEEE Journal of Solid-State Circuits*, vol. 34, pp. 380-387, Mar. 1999.

M. Vergara, M. Strum, W. Eberle and B. Gyselinckx, "A 195KFFT/s (256-points) high performance FFT/IFFT processor for OFDM applications," *Proceedings of the Telecommunications Symposium*, vol. 1, pp. 273-278, 1998.

B.S. Kim and L. Kim, "Low power pipelined FFT architecture for synthetic aperture radar signal processing," *Proceedings of the $39^{th}$ Midwest Symposium on Circuits and Systems*, pp. 1367-1370, vol. 3, 1996.

Y. Ma, "An effective memory addressing scheme for FFT processors," *IEEE Transactions on Signal Processing*, vol. 47, No. 3, pp. 907-911, Mar. 1999.

M. Hasan and T. Arslan, "Coefficient memory addressing scheme for high performance FFT processors," *Electronics Letters*, vol. 37, No. 22, pp. 1322-1324, 2001.

M.C. Pease, "Organization of large scale Fourier processors," *JACM*, vol. 16, No. 3, pp. 474-482, 1969.

L.G. Johnson, "Conflict free memory addressing for dedicated FFT hardware," *IEEE Trans. Circuits System II*, vol. 39, No. 5, pp. 312-316, May 1992.

Y. Ma and L. Wanhammar,"A hardware efficient control of memory addressing for high-performace FFT processors," *IEEE Transactions on Signal Processing*, vol. 48, pp. 917-921, Mar. 2000.

B.M. Baas, "An energy efficient single-chip FFT processor," *Proceedings of the Symposium on VLSI Circuits*, pp. 164-165, Jun. 1996.

B.M. Bass, "A 9.5mw 330 μsec 1024-point FFT processor," *Proceedings of the Custom Integrated Circuit Conference*, pp. 127-130, 1998.

J. Vanderkooy and S.P. Lipshitz, "Dither in digital audio," *Journal of Audio Engineering Society*, vol. 35, No. 12, pp. 966-975, Dec. 1987.

M.F. Wagdy, "Effect of various dither forms on quantization errors of ideal a/d converters," *IEEE Transactions on Instrumentation and Measurement*, vol. 38, No. 4, pp. 850-855, Aug. 1989.

F. Harris, "On the use of windows for harmonic analysis with the discrete Fourier transform," *Proceedings of the IEEE*, vol. 66, No. 1, pp. 51-83, 1978.

* cited by examiner

MODULAR PIPELINE FAST FOURIER TRANSFORM

RELATED PATENTS

This application claims the benefit of U.S. Provisional Application to El-Khashab et al., entitled, "MODULAR PIPELINE FAST FOURIER TRANSFORM," Ser. No. 60/516,894, filed Nov. 3, 2003, the content of which is incorporated herein by reference in its entirety.

TECHNICAL FIELD

The invention relates to computation of Fourier transforms, and, more particularly, to a modular pipeline architecture for computing discrete Fourier transforms.

BACKGROUND

Computation of the discrete Fourier transform (DFT) is important in many signal processing applications such as radar processing, spectrum analysis, materials analysis, orthogonal frequency division multiplexing (OFDM), radio astronomy and other applications requiring high data rate DFT computation. The Fourier transform is, in general, a central component in many signal analysis systems. Due to its importance, a wide variety of DFT implementations for general purpose computers, digital signal processors, VLSI circuits and programmable hardware have been developed.

The fast Fourier transform (FFT) is the standard method for computing the DFT. Pipeline implementations have been developed which include a series of computational blocks, each block composed of delay lines, coefficient storage, commutators, multipliers, and adders. In these existing pipeline implementations, the number of delay lines and coefficient storage increases linearly with the size of the transform. Other implementations, including systems using multi-port memories and special address generators to properly order the inputs, and approaches that attempt to gain parallelism in hardware, have also been developed.

SUMMARY

In general, the techniques described herein describe a modular pipeline algorithm and architecture for computing discrete Fourier transforms. For an N-point transform, two pipeline $\sqrt{N}$-point fast Fourier transform modules are combined with a center element. The center element contains memories, multipliers and control logic.

In one embodiment, the invention is directed to a method in which a first fast Fourier transform (FFT) is performed on a set of inputs to produce intermediate values, a pre-rotation of the intermediate values is performed, and a second fast Fourier transform is performed on the pre-rotated intermediate values to produce a set of outputs.

In another embodiment, the invention is directed to a method in which a first fast Fourier transform (FFT) is performed on a set of N inputs to produce N intermediate values, the N intermediate values are multiplied by a set of N pre-rotation coefficients to produce N pre-rotated intermediate values organized into $\sqrt{N}$ first groups, the N pre-rotated values are reorganized into $\sqrt{N}$ new groups, each new group containing one of the N intermediate values from each of the $\sqrt{N}$ first groups, and a second fast Fourier transform (FFT) is performed on the set of N reorganized pre-rotated values to produce N outputs.

In another embodiment, the invention is directed to a system for performing fast Fourier transforms, including a first stage that performs a first fast Fourier transform (FFT) on a set of inputs to produce intermediate values, a center stage that performs a pre-rotation of the intermediate values, and a second stage that performs a second fast Fourier transform on the pre-rotated intermediate values to produce a set of outputs.

The details of one or more embodiments of the invention are set forth in the accompanying drawings and the description below. Other features, objects, and advantages of the invention will be apparent from the description and drawings, and from the claims.

DETAILED DESCRIPTION

The description is directed to a modular pipeline algorithm and hardware architecture to compute the fast Fourier transform (FFT). The modular pipeline FFT uses a divide and conquer approach to reduce an N point FFT to a plurality of $\sqrt{N}$ point FFTs arranged in a pipeline configuration. In other words, the modular pipeline FFT combines two N-point FFTs to compute an $N^2$-point FFT. A center element joins identical pipeline FFT units together and provides the necessary control logic and data storage to compute the FFT.

The Fourier transform is a powerful tool for processing signals. When applied to a function of time, the transform yields a function of frequency. These are called the "time domain" and the "frequency domain." Similarly, given a function in the frequency domain, the inverse Fourier transform provides the time domain equivalent. The Fourier transform of a continuous time signal f(x) is given by the following equation.

$$F(\omega) = \int_{-\infty}^{\infty} f(x)e^{-j\omega x} dx$$

Digital systems examine a signal by taking periodic samples at some sampling frequency, $f_s$. The Discrete Fourier Transform (DFT) is used to computer the Fourier transform of discrete sampled signals and is given by the following equation where N is the number of discrete samples.

$$X(k) = \sum_{n=0}^{N-1} x(n) W_N^{nk}, 0 \leq k \leq N-1$$

Figure 1:
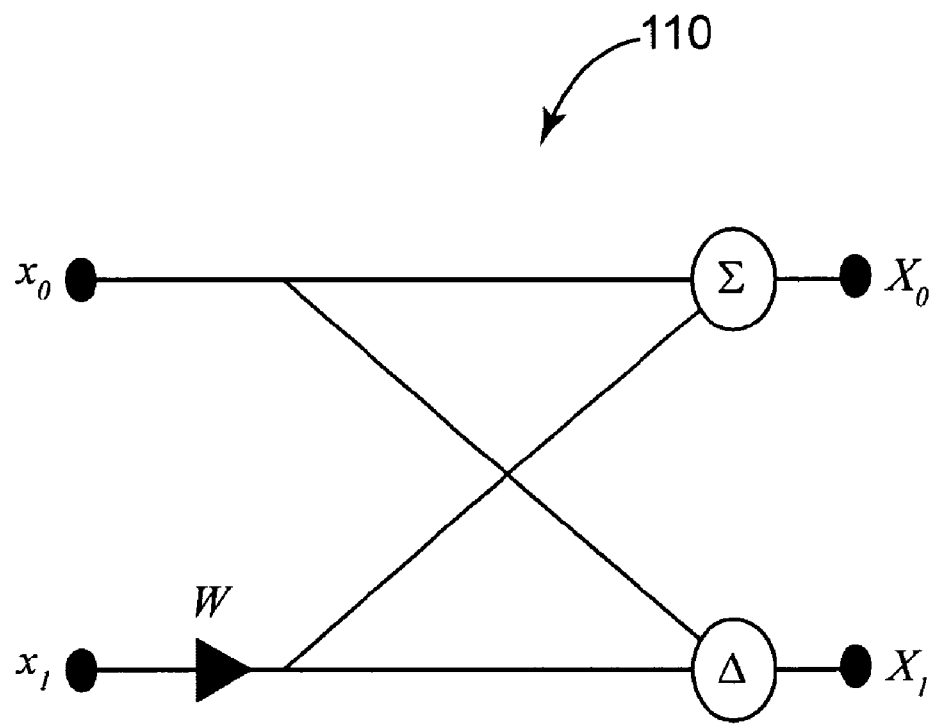
FIG. 1 is a block diagram illustrating a radix-2 butterfly.

The Fast Fourier Transform (FFT) is more efficient than computing the DFT directly from the above equation. There are several algorithms generally referred to as FFTs. The FFT is represented pictorially with a "butterfly" diagram. A simple radix-2 butterfly is shown in FIG. 1. Complex addition and subtraction are represented by Σ and Δ, respectively. Complex multiplication is depicted with a black triangle. As shown in FIG. 1, the simplest 2-point FFT with complex inputs and outputs requires one complex multiplier and two complex adders.

The inputs and outputs of the radix-2 butterfly are denoted $x_k$, $x_j$ and $X_k$, $X_j$, respectively. The W represents the coefficient from the above FFT equation. The values of $X_0$ and $X_1$ are given by the following equations.

$$X_0 = x_0 + W x_1$$

$$X_1 = x_0 - W x_1$$

A radix-4 butterfly may be implemented by combining two radix-2 butterflies, or may be implemented so as to realize a savings of four real multipliers and six real adders. The radix-4 butterfly may result in increased efficiency. Longer FFTs may be computed by combining series of butterfly operations.

The modular pipeline FFT described herein computes an N point FFT by performing a series of √N point transforms. Specifically, to compute an N point transform, the algorithm performs 2√N, √N point transforms. The operations are divided into two stages with √N transforms in each stage. The inputs are divided into √N groups of √N points each. The first stage performs an FFT on each group to obtain a set of intermediate values. The intermediate values are organized into √N new groups containing one point from each of the groups. The second stage then performs an FFT on each of the new groups to obtain the final outputs. A multiplication of the intermediate values by a set of "pre-rotation" coefficients is also performed before the second stage.

The modular pipeline FFT techniques described herein are useful in any system that requires the computation of real-time FFTs. These include real-time signal processing systems for synthetic aperture radar (SAR), low power embedded signal processing, systems requiring high data rate FFT computation, and digital filtering.

With the modular pipeline FFT architecture, the total bits of delay within each pipeline module are reduced as compared to conventional systems. The reduction of delay elements in each module also reduces the number of bit transitions. The reductions in pipeline delay elements reduce the dynamic power required for the system. In a conventional system, the power is proportional to N whereas in the modular pipeline, the power is proportional to √N. The modular pipeline FFT algorithm can reduce power in existing FFTs and permit the computation of long FFTs. The modular pipeline FFT algorithm is suited to both custom and programmable logic.

The modular pipeline FFT algorithm can compute FFTs with less dynamic power than its conventional equivalent. The new architecture can compute an N point FFT with. approximately the same hardware as a √N point conventional FFT. By using conventional FFT modules, many existing techniques that examine noise, mathematical error, and optimizations (floating point, block floating point, integer, etc.) are still applicable.

The modular pipeline FFT architecture is also more area efficient than the conventional pipeline architecture. In a conventional pipeline, for optimum area utilization, each pipeline stage must be unique. With the modular pipeline FFT described herein, modules are intentionally duplicated which reduces the design time. Further, given equally sized transforms, the modular pipeline FFT is more space efficient than a conventional algorithm.

The modular pipeline FFT algorithm permits the computation of FFTs in hardware with less power than conventional approaches. The algorithm permits the computation of FFTs too long to compute with conventional hardware pipelines. It also provides an architecture that is suited to gate-limited programmable logic. The architecture reduces the overall number of D-flip-flops (DFF), thereby reducing dynamic power requirements. For an $N^2$-point FFT, the number of DFFs is reduced to N.

The modular pipeline FFT also provides an advantage when being designed into systems. Namely, there is a reduction in the number of pipeline stages that must be engineered. This architecture uses identical modules which facilitate the reuse of custom pipeline stages without a loss of silicon area efficiency. In addition, the reduction in DFFs permits the use of field programmable gate arrays to compute FFT lengths which were previously not possible using programmable logic.

The modular pipeline FFT expands upon conventional radix-2 and radix-4 pipeline FFT architectures. This permits designers to use any optimizations and enhancements that were previously developed. Such enhancements might include floating point and block floating point units as well as integer FFT pipelines. In addition, many conventional FFT cores are available which can be directly integrated into the modular pipeline architecture. By using a pair of identical N-point FFT cores, an $N^2$-point FFT unit can be built, limiting the custom engineering to just the center element.

Thus, the modular pipeline FFT described herein provides several advantages. The techniques can be implemented using radix-2 and radix-4 architecture. The modular pipeline FFT provides the same data bandwidth (data/clock) as a conventional pipeline FFT with reduced power. The modular pipeline FFT facilitates computation of longer FFTs in real-time and is suitable for programmable or custom logic. Moreover, because the modular pipeline FFT couples conventional pipeline FFT architecture with specialized data storage and address generation logic, it allows designers to use traditionally available FFT cores to reduce power or compute larger FFTs.

The modular pipeline FFT algorithm computes an N point FFT by performing a series of $\sqrt{N}$ point transforms. Specifically, to compute an N point transform, the algorithm performs $2\sqrt{N}$, $\sqrt{N}$ point transforms. The operations are divided into two stages with $\sqrt{N}$ transforms in each stage. The inputs $x_0 \ldots x_n$ are divided into $\sqrt{N}$ groups of $\sqrt{N}$ points each. The first stage performs and FFT on each group to obtain a set of intermediate values. The intermediate values are organized into $\sqrt{N}$ new groups containing one point from each of the previous groups. The second stage then performs and FFT on each of the new groups to obtain the final outputs. There is an additional multiplication between the stages by a coefficient termed a "pre-rotation" coefficient.

The definition of the Discrete Fourier Transform (DFT) is shown in the following equation. Notice that each output, X(k), depends on each x(k).

$$X(k) = \sum_{n=0}^{N-1} x(n) W_N^{nk}, \ 0 \leq k \leq N-1$$

The coefficient $W_N^k$ is given by:

$$W_N^k = e^{-j2\pi \frac{k}{N}}$$

In the following equation the definition is modified into a series of $\sqrt{N}$ point transforms. The intermediate values are denoted by y(k).

$$y(\sqrt{N} k_0 + k_1) = \sum_{m=0}^{\sqrt{N}-1} x(\sqrt{N} m + k_1) W_{\sqrt{N}}^{mk_0}, \ 0 \leq k_0, k_1 \leq \sqrt{N} - 1$$

The N point input vector is divided into $\sqrt{N}$ sets of $\sqrt{N}$ points each. Each $\sqrt{N}$ point transform is performed independently in the first stage. To obtain a correct transform the results of the first stage of DFTs are combined. These combinations then become inputs to the second stage DFT which is given in the following equation.

$$X(\sqrt{N} k_1 + k_0) = \sum_{m=0}^{\sqrt{N}-1} y(\sqrt{N} k_0 + m) W_{\sqrt{N}}^{mk_1}, \ 0 \leq k_0, k_1 \leq \sqrt{N} - 1$$

Given a 16 point transform, each of the coefficients in the above equations has the form $W_4^k$, that is the coefficients are four points on the unit circle. However, a 16 point FFT requires 16 evenly spaced points from the unit circle. Rather than modify the second stage transform, each of the intermediate values is adjusted by a pre-rotation coefficient. The adjustment is given in the following equation. The pre-rotation coefficient is always of the form $W_N^k$.

$$y'(\sqrt{N}k_0+k_1) = y(\sqrt{N}k_0+k_1) \times W_N^{k_1 k_0}, \ 0 \leq k_0, k_1 \leq \sqrt{N}-1$$

Combining the above equations yields the final stage DFT. The following equation shows an N point staged DFT with two $\sqrt{N}$ point stages. A 16 point MATLAB example is n in Listing 1. In the listing, $M = \sqrt{N}$.

$$X(\sqrt{N} k_1 + k_0) = \sum_{m_0=0}^{\sqrt{N}-1} W_N^{m_0 k_0} \left( \left( \sum_{m_1=0}^{\sqrt{N}-1} x(\sqrt{N} m_1 + m_0) W_{\sqrt{N}}^{m_1 k_0} \right) W_{\sqrt{N}}^{m_0 k_1} \right)$$

-continued $$= \sum_{m_0=0}^{\sqrt{N}-1} \sum_{m_1=0}^{\sqrt{N}-1} x(\sqrt{N} m_1 + m_0) W_{\sqrt{N}}^{m_1 k_0} W_{\sqrt{N}}^{m_0 k_1} W_N^{m_0 k_0}$$

$$= \sum_{m_0=0}^{\sqrt{N}-1} \sum_{m_1=0}^{\sqrt{N}-1} x(\sqrt{N} m_1 + m_0) W_N^{m_1 k_0 \sqrt{N}} W_N^{m_0 k_1 \sqrt{N}} W_N^{m_0 k_0}$$

$$= \sum_{m_0=0}^{\sqrt{N}-1} \sum_{m_1=0}^{\sqrt{N}-1} x(\sqrt{N} m_1 + m_0) W_N^{m_1 k_0 \sqrt{N} + m_0 k_1 \sqrt{N} + m_0 k_0}$$

$$0 \leq k_0, k_1 \leq \sqrt{N} - 1$$

---

Listing 1: MATLAB Example of the Modular Pipeline FFT Algorithm

```
1  function X=algorithm_example;
2
3  % Input array (example values)
4  x = [ 234 1 12 1 14 5 16 1 12 1 6 13 1 15 1 1 ];
5  X=zeros(1,16); % Output Array
6  M=4;     % Module FFT Size
7  N=16;    % Complete FFT Size
8
9  for k1=0:M-1;
10     for k0=0:M-1;
11         for m0=0:M-1;
12             for m1=0:M-1;
13                 X(1+M*k1+k0) = X(1+M*k1+k0)...+
14                     x(1 + M*m1+m0) *
                        wt(m1*k0*M+m0*k1*M+m0*k0,N);
15             end;
16         end;
17     end;
18  end;
19
20
21  function w=wt(x,b);
22  w = exp(-1*i*2*pi.*x/b);
23  end;
```

Figure 2:
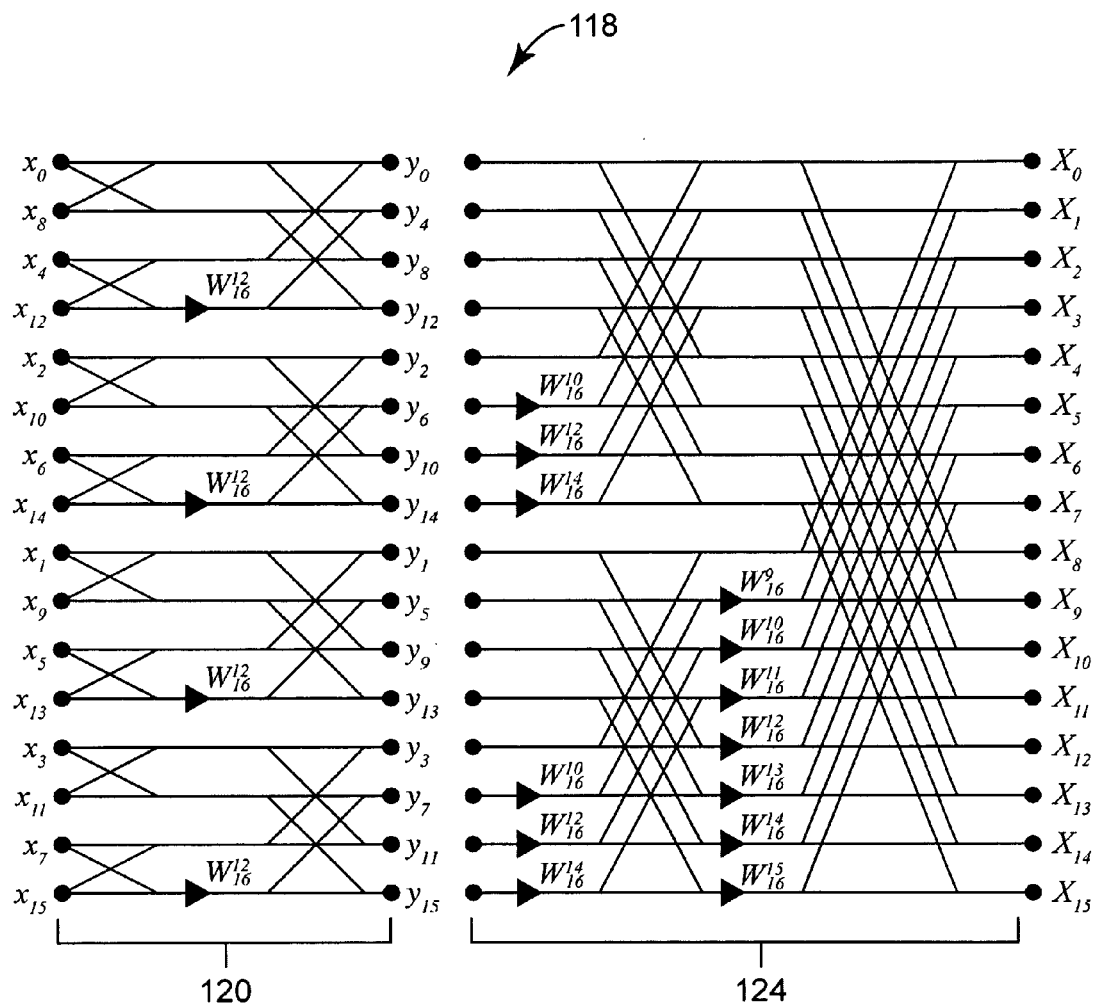
FIG. 2 is a butterfly diagram with intermediate values for a 16-point FFT.

FIG. 2 is a butterfly diagram with intermediate values for a 16 point FFT. In this embodiment, the diagram is split in the center, with a series of $\sqrt{N}$, $\sqrt{N}$ point transforms on each side. The first stage 120 computes four 4 point transforms to generate the intermediate results. Upon observation, it may be seen that the FFTs in the first stage 120 are entirely independent. Each first stage FFTs has no data dependency on any other first stage FFT. The intermediate results, $y_k$, are shown in the center. In the second stage 124 there are again four independent FFTs which overlap in the drawing. Further, each of the second stage 122 FFTs requires an output from each of the first stage 120 FFTs. This is to be expected since the definition of the DFT indicates that each output depends on each and every input. As a result, the process is to compute each $y_k$ output from the first stage FFTs before beginning any of the second stage FFTs. The dependencies for this diagram are listed in Table 1. For example, the output vector ($X_2$, $X_6$, $X_{10}$, $X_{14}$) is dependent upon the intermediate values ($y_8$, $y_{10}$, $y_9$, $y_{11}$). Each of these values was in turn produced by a different first stage FFT.

TABLE 1

| Stage 1 | | Stage 2 | |
| --- | --- | --- | --- |
| Inputs | Outputs | Inputs | Outputs |
| <$x_0, x_8, x_4, x_{12}$> | <$y_0, y_4, y_8, y_{12}$> | <$y_0, y_2, y_1, y_3$> | <$X_0, X_4, X_8, X_{12}$> |
| <$x_2, x_{10}, x_6, x_{14}$> | <$y_2, y_6, y_{10}, y_{14}$> | <$y_8, y_{10}, y_9, y_{11}$> | <$X_2, X_6, X_{10}, X_{14}$> |
| <$x_1, x_9, x_5, x_{13}$> | <$y_1, y_5, y_9, y_{13}$> | <$y_4, y_6, y_5, y_7$> | <$X_1, X_5, X_9, X_{13}$> |
| <$x_3, x_{11}, x_7, x_{15}$> | <$y_3, y_7, y_{11}, y_{15}$> | <$y_{12}, y_{14}, y_{13}, y_{15}$> | <$X_3, X_7, X_{11}, X_{15}$> |

In this FFT, the result is unchanged because none of the coefficients, inputs, or outputs have changed. However, suppose the second stage FFT is replaced with a duplicate of the first stage. The coefficients in the second stage are different and therefore the output is no longer preserved.

Figure 3:
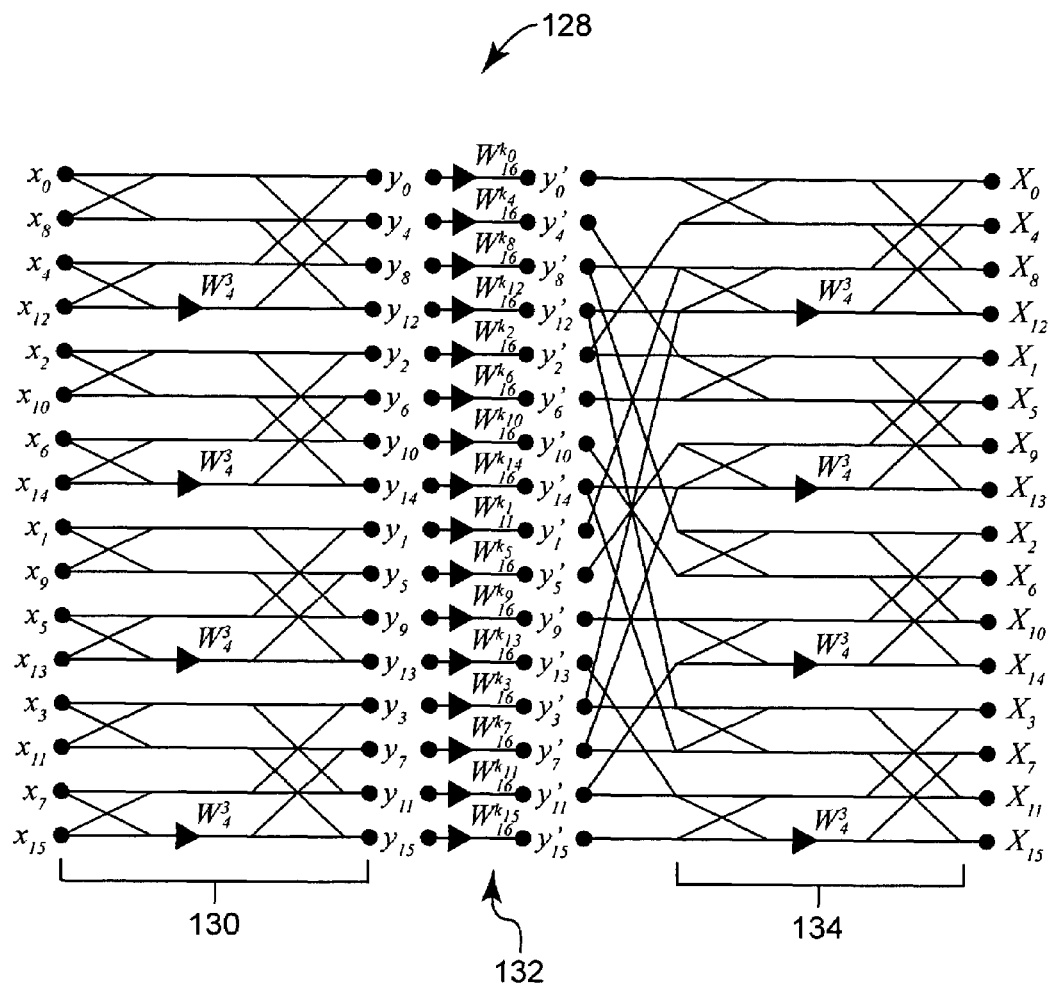
FIG. 3 shows a butterfly diagram of the modular pipeline FFT with identical first and second stages and pre-rotation coefficients.

In order to correct the output, each intermediate value is first "pre-rotated" by a specific coefficient, $W_N^k$. FIG. 3 shows a butterfly diagram of the modular pipeline FFT with identical first and second stages 130 and 134, respectively, and pre-rotation coefficients 132. The pre-rotation coefficients may be determined from either the definition of the DFT, the above equation for an N point staged DFT with two $\sqrt{N}$ point stages, or the butterfly diagram. When the diagram of the staged modular pipeline FFT in FIG. 3 is compared to the original butterfly diagram in FIG. 2, the difference is apparent. The pre-rotation multipliers 132 of the staged FFT are shown in the center of FIG. 3. The first stage FFTs 120 and 130 are identical. The second stage FFTs 124 and 134 are quite different, however. In the staged FFT of FIG. 3, most of the multipliers in the second stage 134 are eliminated. In this example, the second stage FFTs 134 are basic 4 point transforms. The pre-rotation weights 132 are found by examination of the equations governing the original and staged FFTs. Each of the FFTs in the second stage creates $\sqrt{N}$ outputs given $\sqrt{N}$ inputs. Rather than examine all $\sqrt{N}$ outputs, the pre-rotation weights are determined from one of the outputs of each of the $\sqrt{N}$ second stage FFTs. The following equations show four outputs, $X_{12} \ldots X_{15}$, from the original butterfly diagram. This choice of outputs assures all second stage inputs and pre-rotation coefficients are considered. Note that in some cases a $W_{16}^8$ term has been replaced with $-1$. The motivation for this substitution will become apparent once the pre-rotation coefficients are determined.

$X_{12}=y_0-y_2-W_{16}^{12}(y_1 y_3)$ $X_{13}=y_4-W_{16}^{10}y_6-W_{16}^{13}(y_5-W_{16}^{10}y_7)$ $X_{14}=y_8-W_{16}^{12}y_{10}-W_{16}^{14}(y_9-W_{16}^{12}y_{11})$ $X_{15}=y_{12}-W_{16}^{14}y_{14}-W_{16}^{15}(y_{13}-W_{16}^{14}y_{15})$

The outputs of the second stage of FFT is shown in the following equations. In this case, several $-1$ operations have been replaced by the equivalent coefficient.

$X_{12}=y_0+W_{16}^8 y_2-W_{16}^{12}(y_1+W_{16}^8 y_3)$ $X_{13}=y_4+W_{16}^8 y_6-W_{16}^{12}(y_5+W_{16}^8 y_7)$ $X_{14}=y_8+W_{16}^8 y_{10}-W_{16}^{12}(y_9+W_{16}^8 y_{11})$ $X_{15}=y_{12}+W_{16}^8 y_{14}-W_{16}^{12}(y_{13}+W_{16}^8 y_{15})$

The pre-rotation coefficients are found by comparison of the sequences of equations for $X_{12} \ldots X_{15}$. Note that $W_{16}^0=1$. The following show the pre-rotation coefficients for this 16 point transform.

| | | | |
| --- | --- | --- | --- |
| $y_0' = W_{16}^0 y_0$ | $y_2' = W_{16}^0 y_2$ | $y_1' = W_{16}^0 y_1$ | $y_3' = W_{16}^0 y_3$ |
| $y_4' = W_{16}^0 y_4$ | $y_6' = -W_{16}^2 y_6$ | $y_5' = W_{16}^1 y_5$ | $y_7' = -W_{16}^3 y_7$ |
| $y_8' = W_{16}^0 y_8$ | $y_{10}' = -W_{16}^4 y_{10}$ | $y_9' = W_{16}^2 y_9$ | $y_{11}' = -W_{16}^6 y_{11}$ |
| $y_{12}' = W_{16}^0 y_{12}$ | $y_{14}' = -W_{16}^6 y_{14}$ | $y_{13}' = W_{16}^3 y_{13}$ | $y_{15}' = -W_{16}^9 y_{15}$ |

By multiplying the pre-rotation coefficients by the second stage inputs, the proper output is computed. This is shown in the following equations.

$X_{12}=y_0+W_{16}^8 y_2-W_{16}^{12}(y_1+W_{16}^8 y_3)$ $X_{13}=y_4-W_{16}^8 W_{16}^2 y_6-W_{16}^{12}(W_{16}^1 y_5-W_{16}^8 W_{16}^3 y_7)$ $X_{14}=y_8-W_{16}^8 W_{16}^4 y_{10}-W_{16}^{12}(W_{16}^2 y_9-W_{16}^8 W_{16}^6 y_{11})$ $X_{15}=y_{12}-W_{16}^8 W_{16}^6 y_{14}-W_{16}^{12}(W_{16}^3 y_{13}-W_{16}^8 W_{16}^9 y_{15})$

Upon examination, there is a regular pattern for the pre-rotation coefficients. Suppose that the second stage inputs are described by an FFT number, g and a sample number, s. The FFT number (or group number) describes which second stage FFT processes a particular input. The sample number, s indicates a unique input number within a particular FFT.

Referring to the pre-rotation coefficients $y_0'$ to $y_{15}'$, the amount of rotation increases predictably for intermediate values $y_0$ to $y_{N-1}$. Since the determination of the pre-rotation weights is made in advance, each weight can be computed before it is needed. The pre-rotation weight is defined by both the group number and sample number.

Figure 4:
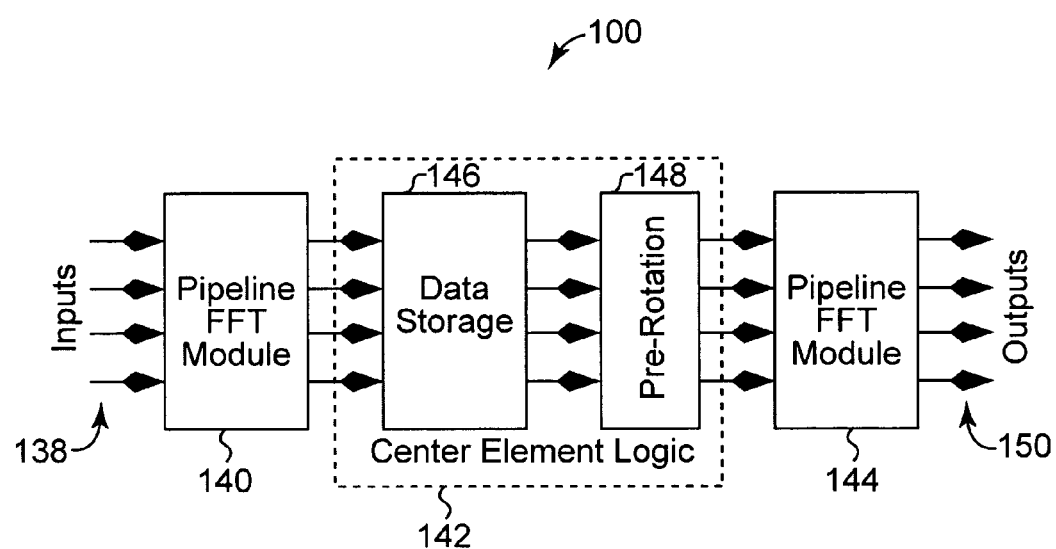
FIG. 4 is a block diagram of the modular pipeline FFT architecture.

The ability to predict and compute the pre-rotation weights leads to a design in which an N point FFT is divided into two $\sqrt{N}$ point FFTs. The ability to split the butterfly diagram as shown in FIG. 4 facilitates the use of distinct but identical modules to compute the first and second stage FFTs with a series of N multiplications between them. This particular aspect of the algorithm leads to the development of the modular pipeline FFT system.

FIG. 4 shows a block diagram of a modular pipeline FFT 100. The modular pipeline FFT 100 computes an N point FFT using two $\sqrt{N}$ point conventional pipeline FFT modules. The module pipeline FFT 100 includes a set of inputs 138, a first stage pipeline FFT module 140, center element logic 142, a second stage pipeline FFT module 144, and outputs 150. Center element logic 142 includes data storage 146 and a pre-rotation element 148. Recall that in the split butterfly described above with respect to FIG. 3, all of the first stage FFTs are performed before performing any of the second stage FFTs. Storage data element 146 of FIG. 4 maintains all of the first stage outputs until they are all determined.

Given the basic design of FIG. 4, a set of design criteria which may be considered when developing a hardware implementation for the modular pipeline FFT may include any one or more of the following criteria. The algorithm may be "programmable logic aware" in that it does not consume an inordinate number of gates or have long stage delays. The system may utilize short, local interconnects rather than long, high latency global interconnects. The implementation may be comprised of standard "cells." The design may be based on a relatively small number of cell types to reduce the amount of specialized logic required. The resulting design may accept very high data rates and compute FFTs with as little latency as possible. In addition, the design may be pipelined to input and output data on every clock cycle, providing the maximum possible throughput. The implementation may be capable of very long FFTs. The algorithm and design should efficiently (in both power and area) compute FFTs where 64K≦N≦16M points, and perhaps beyond without an excessively large number of delay elements. Also, the additional logic and components should not significantly impact the complexity or timing of the system.

Figure 5:
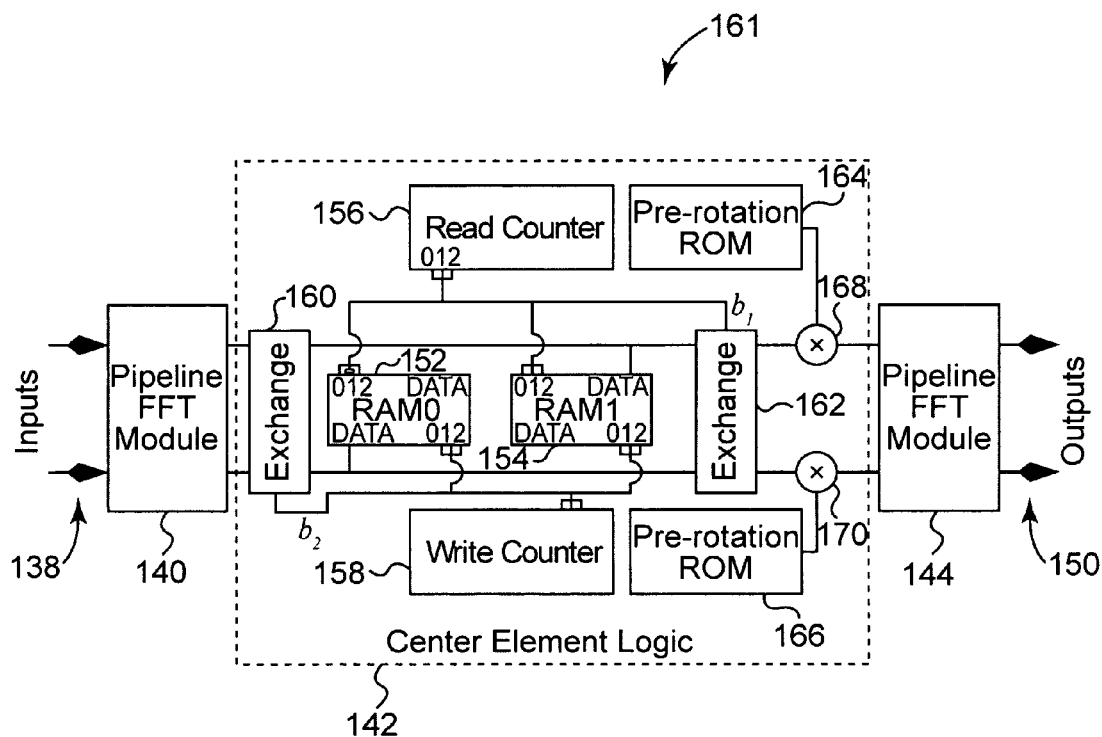
FIG. 5 is a block diagram of an independent counter based modular pipeline FFT.

FIG. 5 shows a block diagram of an embodiment for an independent counter based address generator of a system for a 16 point transform 161. This embodiment minimizes hardware and does not have any long delay logic. It is based on the modular pipeline FFT design shown in FIG. 4 and includes dual pipelined FFT units 140 and 144 joined with center element logic 142. In this embodiment, center element logic 142 includes memories 152 and 154. Memories 152 and 154 are addressed with read counter 156 and write counter 158.

The memory mapping is handled in the wiring of the address lines. For example, the write address is given by ROTL (j, I). The read address has bit $$\frac{\log_2(N)}{2} - 1$$

inverted between the memories. Data exchange units 160 and 168 are enabled entirely by a single bit in read counter 156 or write counter 158. Pre-rotation ROMs 164 and 166 contain all the necessary coefficients, in the order that they are needed, so it can be driven from either the read counter 156 or write counter 158. Since the address line rotation is fixed, pre-rotation ROM 166 may be replaced with a multiplexer. In this embodiment, memories 152 and 154 are dual-port memories. Dual-port memories allow simultaneous access to two different addresses using independent address and data busses. Multipliers 168 and 170 perform the multiplication of the intermediate values from data exchange unit 162 with the pre-rotation coefficients stored in pre-rotation ROMs 164 and 166.

Figure 6:
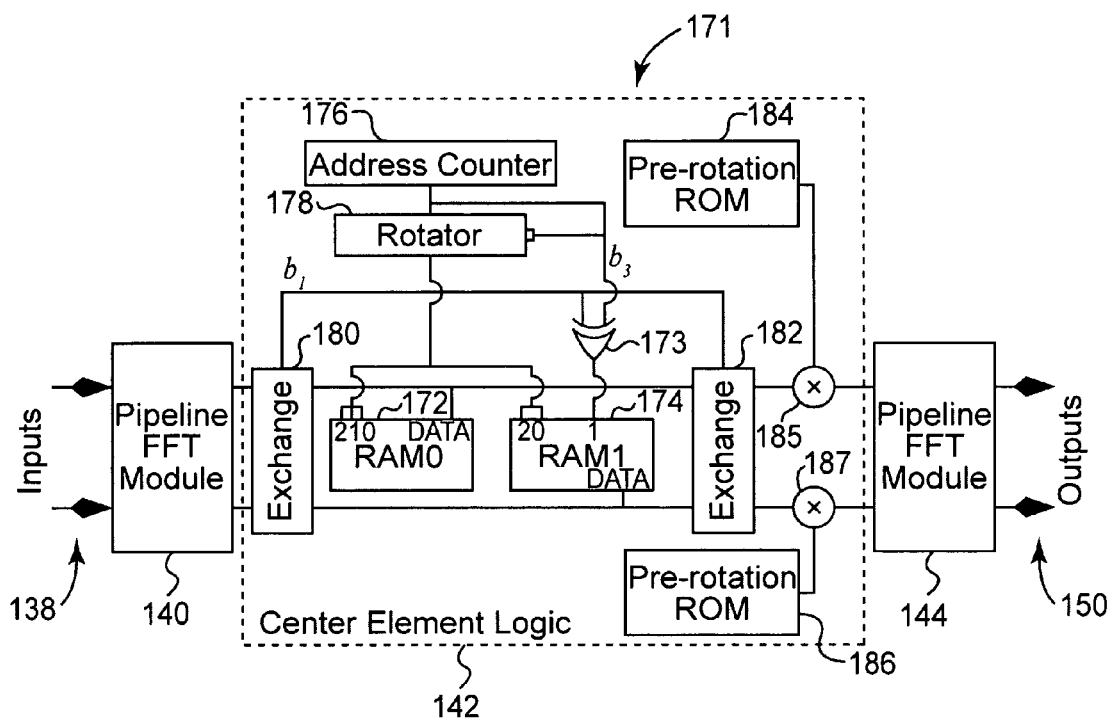
FIG. 6 is a block diagram of a unified counter based modular pipeline FFT.

FIG. 6 shows a block diagram of an embodiment for a unified counter based address generator of a system for a 16 point transform 171. Again, the embodiment shown in FIG. 6 is based on the modular pipeline FFT design shown in FIG. 4 and includes dual pipelined FFT units 140 and 144 joined with a center element logic 142. This embodiment reduces the number of counters (and subsequently the area required) to a single address counter 176 of $\log_2(N)+1$ bits.

This embodiment further includes two memories 172 and 174, exchange units 180 and 182. The most significant bit (MSB) determines whether data is being written to (b=0) or read from (b=1) the center unit 142. XOR gate 173 properly maps the address lines to memory 174. XOR gate 173 modifies the address of memory 174 depending upon whether the system is reading or writing from the center element 142. In this embodiment, the rotation is always by a fixed amount (half the width of the counter) so a multiplexer can replace the pre-rotation ROMs 184 and 186. Multipliers 185 and 187 perform the multiplication of the intermediate values from data exchange unit 182 with the pre-rotation coefficients stored in pre-rotation ROMs 184 and 186.

In the embodiment shown in FIG. 6, the system can maintain the throughput of the standard pipeline FFT if most of the control logic is duplicated and the memory is doubled. The duplication of the counters, memories, and addressing logic drastically increases the hardware complexity. Further, it does not exhibit the memory efficiency of previous algorithms.

The architectures shown in FIGS. 5 and 6 are radix-2 designs. Radix-4 designs will require four memories and more complex data exchangers. Radix-4 architectures will also use four ROMs for the pre-rotation coefficients.

Figure 7:
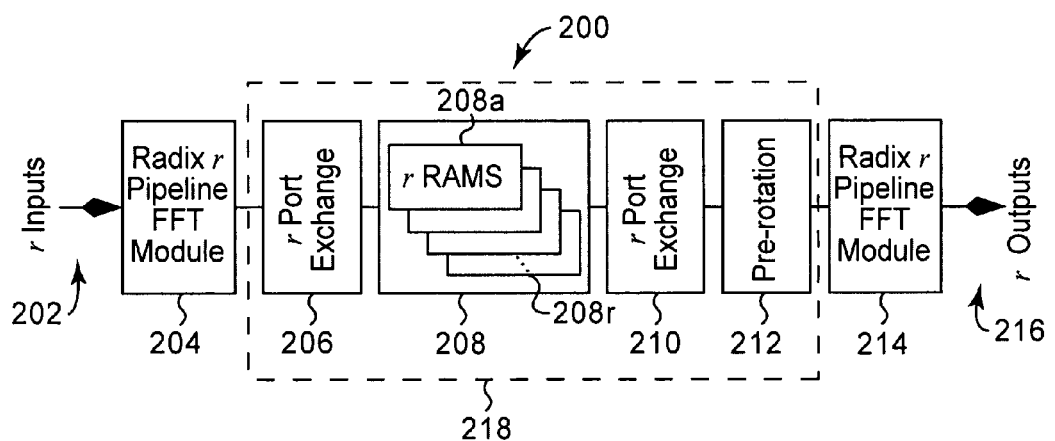
FIG. 7 is a block diagram of a radix-r modular pipeline FFT.

FIG. 7 shows a block diagram for an embodiment of a radix-r modular pipeline FFT 200. Again, this embodiment of the N point modular pipeline FFT is based upon a pair of conventional $\sqrt{N}$ point pipeline FFTs 204 and 214. The pipeline FFT modules 204 and 214 in conjunction with a specialized center element 218 facilitate the computation of an N point FFT. Center element 218 contains data memory 208, pre-rotation coefficient memory 212, and address generation logic (not shown in FIG. 7). The design of the center element 218 allows data to be both read from the input pipeline and written to the output pipeline simultaneously. This permits the system to maximize the data throughput.

The conventional pipeline FFT has unique input and output address sequences. The architectures in this embodiment shown in FIG. 7 input the data out-of-order as well, but the sequence is slightly different than a bit-reversed sequence. Addressing logic for the center element 218 of the modular pipeline FFT 200 shown in FIG. 7 is discussed in more detail below.

The address generation logic in the center element 218 is controlled by a single counter (not shown in FIG. 7). The data exchangers 206 and 210 are controlled by specific counter bits. The center element address generator alternates between two distinct address sequences. The selection and generation of these sequences assures that there is never a data collision between incoming and outgoing data. The center element address generation logic is critical to assuring that the entire system remains pipelined and that it uses the minimum amount of memory.

In the embodiment shown in FIG. 7, the pre-rotation unit 212 is shown after the second data exchanger 210. It shall be understood that these may be alternated by adjusting which ROM stores each of the pre-rotation coefficients, and that the invention is not limited in this respect.

Center element 218 in the modular pipeline architecture 200 acts as a pipeline coupler. All data flowing from first stage 204 to second stage 214 must pass through center element 218. Center element 218 provides the required data storage, pre-rotation coefficient memory, data exchangers, and address generation logic. Center element 218 serves three main purposes. Namely, it reorders the input data for the second stage, uses the pre-rotation coefficients to adjust the data, and provides temporary storage for the first stage output data.

Figure 8:
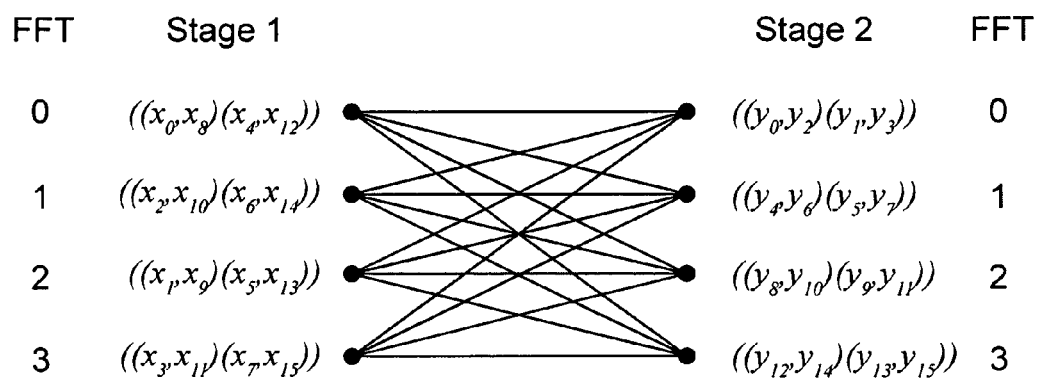
FIG. 8 is a data dependency diagram for a 16-point transform.

The pre-rotation adjustment was previously examined. However, unlike the embodiments shown in FIGS. 5 and 6, the data storage is specific to this architecture. As mentioned above, center element 218 performs data reordering and manages the stored data. Recall that the second stage FFT requires a single point from each of the first stage transforms. A data dependency diagram is shown in FIG. 8. If this N=16 point FFT were processed with a four point pipeline, four FFTs would be required in each stage. The dependency diagram of FIG. 8 shows that none of the second stage FFTs can commence until all the first stage transforms are completed. Therefore, as the first stage pipeline FFT completes a transform, the output must be temporarily stored until all of the second stage input operands are ready. This requires enough memory to store N points for an N point transform. Center element 218 must therefore provide storage for N elements. In the radix-r modular pipeline FFT embodiment shown in FIG. 7, this memory is divided among a group of r memories 208. Since the conventional pipeline inputs and outputs r points per cycle, each memory may be accessed for read and write once per clock cycle.

Center element 218 must also reorder the input data for the second stage. Referring again to the dependency diagram of FIG. 8, the input operands are written to the first stage pipeline in the same sequence for each FFT. In other words, $x_0 \ldots x_3$ are written to the same port of the first stage FFT pipeline. This is required in order to preserve conventional pipeline behavior. The result is that $y_0 \ldots y_3$ are output from the same pipeline port. If in fact this occurs, then the four points needed for the second stage FFT will all reside in the same memory within the center element. However, to maintain conventional pipeline performance, each second stage input may reside in a distinct memory.

The modular pipeline FFT 200 employs a pair of data exchangers 206 and 210 to map pipeline ports to certain memories 208. In one embodiment, data exchangers 206 and 210 may be r×r multiplexers. The modular pipeline addressing logic (not shown in FIG. 7) controls how the pipeline ports are mapped to the memories 208. The first stage data exchanger 206 controls which memory 208a-208r receives the pipeline outputs from the first stage pipeline FFT module 204. The second stage data exchanger 210 maps the outputs of the memories 208a-208r to the appropriate input ports on the second stage pipeline FFT module 214.

The last component of center element 218 is the address generation logic. For example, consider an N point modular pipeline FFT that processes two complete N point transforms. During operation, center element 218 stores the data for the first transform to memory. Once N points have been written to memory, the system can begin to process the second transform. The second transform data is now written to the pipeline. However, the first transform is still in memory. In one embodiment, the outputs from the first stage pipeline are written into the same memory locations as the points leaving the memory for the second stage pipeline. The two address sequences are generated by selecting one of two static mappings to the memory address lines. During both address sequences, the lower memory address lines are identical across all memories 208a-208r. A radix-r FFT will divide each center memory into r sections. The active section for each memory 208a-208r is determined by the upper counter address bits. Given that the address mappings are static, a multiplexer rather than a rotator selects the address sequence. This operation is illustrated in FIGS. 9A-9C.

Figure 9A:
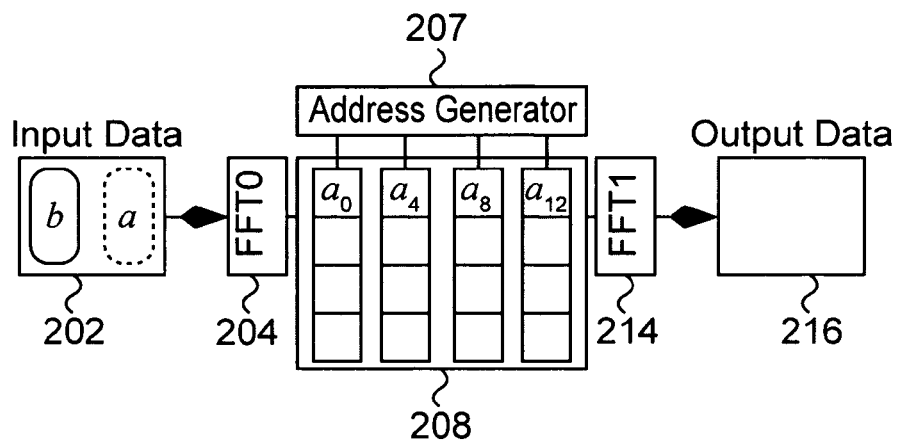
FIGS. 9A-9C show data flow in the center element memory.
Figure 9B:
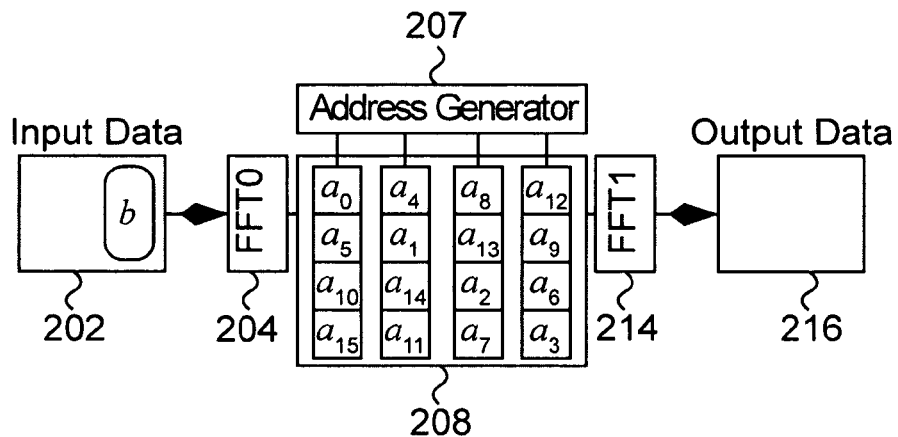
Figure 9C:
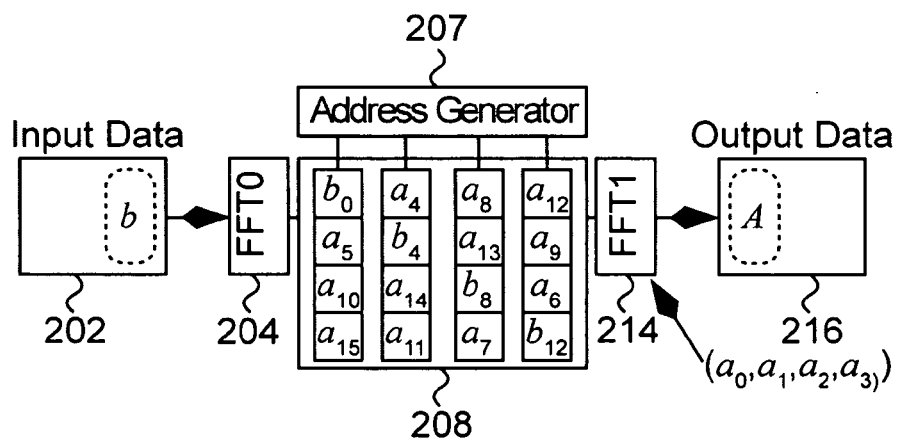

As shown in FIGS. 9A-9C, the address generation logic utilizes two alternative addressing schemes. In FIG. 9A, four points of the a data set are written to memory. During the processing of data set a, the system uses a counter to address each of the center element memories. In FIG. 9B, the a data set is completely in memory. However, when data set b is input, the addresses generated are different for each of the four memories. In FIG. 9C, four points from the b data set are written to memory while four points from the a data set enter the second FFT module. Notice in FIG. 9C that the locations occupied by data set a elements are then replaced by data set b elements. When data set b is loaded entirely into the center memories, the address sequence reverts to the original sequence. This careful selection of the address sequences assures no data collisions can occur.

FIGS. 9A-9C also illustrate the role of the data exchangers 206 and 210. Recall from previous discussions that $a_0, a_4, a_8, a_{12}$ all arrived on the same port from the first stage pipeline. The first stage data exchanger 206 determines the destination of each element so that they could be accessed simultaneously for the second stage pipeline 214. A radix-2 data exchanger input to output mapping is shown in Table 2.

TABLE 2

| | Input Ports | |
|---|---|---|
| Mode | Port 0 | Port 1 |
| 0 | 0→0 | 1→1 |
| 1 | 0→1 | 1→0 |

The data is either passed straight through or swapped. Given a radix-4 pipeline, $$\frac{r}{2}$$

counter bits control which exchange mode is selected. The radix-4 commutator has four input and output ports. Although such a commutator has many input to output mapping combinations, four unique mappings are used. The radix-4 data exchanger input to output mapping modes are shown in Table 3.

TABLE 3

| | Input Ports | | | |
|---|---|---|---|---|
| Mode | Port 0 | Port 1 | Port 2 | Port 3 |
| 0 | 0→0 | 1→1 | 2→2 | 3→3 |
| 1 | 0→1 | 1→0 | 2→3 | 3→2 |
| 2 | 0→2 | 1→3 | 2→0 | 3→1 |
| 3 | 0→3 | 1→2 | 2→1 | 3→0 |

Center element 218 also maintains and addresses the pre-rotation coefficient memory. The coefficients are loaded before pipeline operation. Rather than requiring additional addressing logic, the coefficients are loaded into the correct pre-rotation ROM in the proper order in which they are needed. This allows the center element counter to address the ROMs directly. The coefficient ROMs are tied directly to the pre-rotation multipliers. The logic to compute the pre-rotation coefficients and memory addresses is dependent upon the pipeline radix selection and FFT length.

The operation of the modular pipeline FFT described herein is dependent on the proper combinations of intermediate operands and the organization of the center memory. The conventional decimation-in-time (DIT) pipeline inputs data out-of-order. Specifically, given a radix-r, N point transform, $$\frac{N}{r}$$

sets of data are input to the pipeline. One point is input on each port p per clock k, $$0 \leq k < \frac{N}{r}.$$

The inputs are given by the following equation.

$$p_n(k) = x\left(k + \frac{nN}{r}\right) \quad 0 \leq n < r$$

The output is produced in bit-reverse order as shown in the following equation. The output is given in terms of output clocks, k'.

$$X(\text{bitreverse}(k'))=rk'+p_n \; 0 \leq n < r$$

The modular pipeline FFT architecture 200 shown in FIG. 7 reorders the overall input and output data streams. This facilitates proper operation of the center element data storage and address generation logic. Table 4 shows a modular pipeline FFT input sequence for a radix-2 64 point transform.

TABLE 4

<0, 32>
<1, 33>
<2, 34>
<3, 35>
<4, 36>
<5, 37>
<6, 38>
<7, 39>
<8, 40>
<9, 41>
<10, 42>
<11, 43>
<12, 44>
<13, 45>
<14, 46>
<15, 47>
<16, 48>
<17, 49>
<18, 50>
<19, 51>
<20, 52>
<21, 53>
<22, 54>
<23, 55>
<24, 56>
<25, 57>
<26, 58>
<27, 59>
<28, 60>
<29, 61>
<30, 62>
<31, 63>

Since the modular pipeline decomposes the 64 point transform into a series of 8 point transforms, each row in this table represents a first stage 8 point FFT. The modular pipeline input and output address generators are specific to the radix-2 and radix-4 pipelines.

Lastly, the center element counter is assumed reset (cleared) until the first sample arrives from the first stage pipeline. The same counter is used to drive the pipeline input and output address generators, additional delay lines or combinational logic is needed to "offset" the counters. In particular, the counter lags the system clock by $\log_r(\sqrt{N})$. In a 256 point radix-4 pipeline the center element requires a 3 clock delay.

Figure 10:
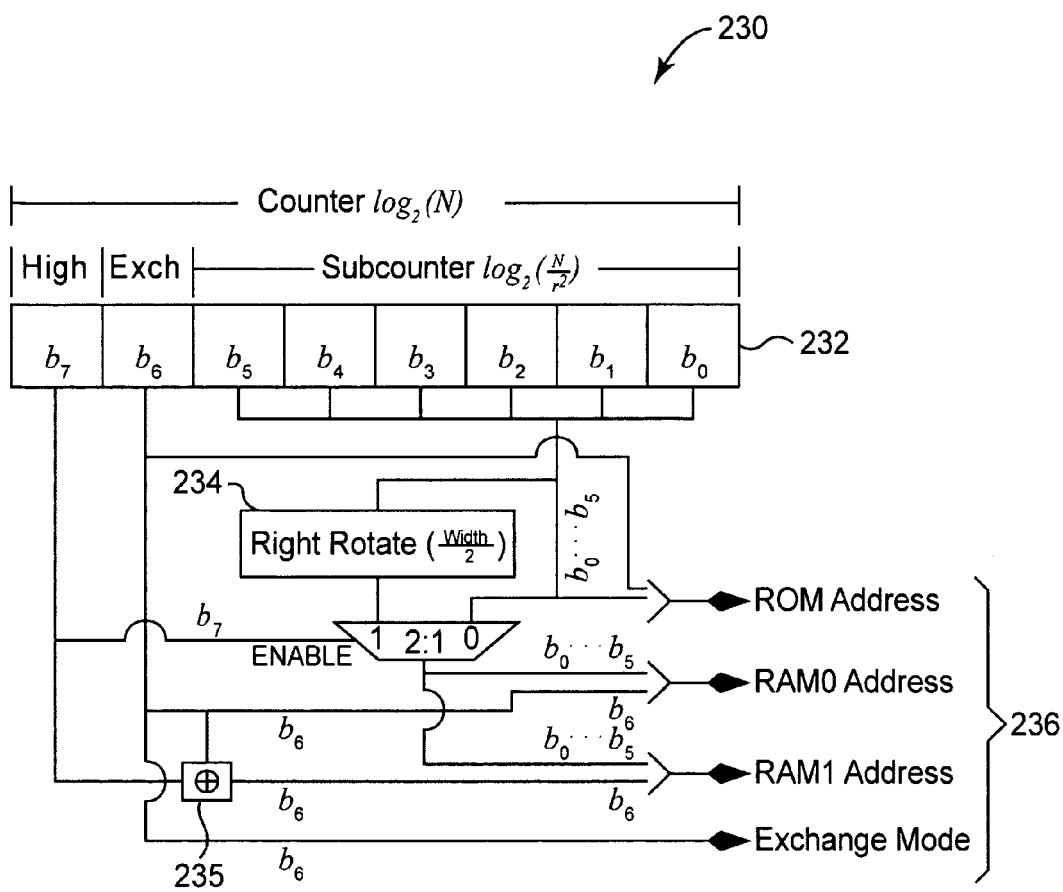
FIG. 10 shows a radix-2 modular pipeline FFT center address generation logic.

The address generator for a modular pipeline FFT may be composed of three main components; an input address generator, a center address generator, and an output address generator. The center address generator is used to address the memories that store the pre-rotation coefficients. FIG. 10 shows a diagram of a center address generator 230 for a radix-2 modular pipeline FFT. Center address generator 230 controls all of the RAM and ROM addressing as well as the mode of the data exchangers via outputs 236. The example center address generator 230 shown in FIG. 10 is for a 256 point transform. Center address generator 230 is controlled by a single counter 232 of width log2 (N). Since this is a radix-2 pipeline, 2 points are processed per clock cycle. Therefore, two complete FFTs are computed during the counter period. The top counter bit, the "High" bit ($b_7$ for a radix-2 FFT) is used to determine which address sequence is active by enabling multiplexor 233. The lower bits ($b_0$-$b_5$ for a radix-2 FFT) are grouped into a sub-counter. These bits are the same for each memory. Each memory is partitioned into r portions. The selected portion is controlled by the "Exch" bit ($b_6$ for a radix-2 FFT) of counter 232. This bit may differ between memories depending on the current address sequence. In particular, for the 256 point transform, bit $b_6$ of the memories is identical during address sequence 0, but is inverted during address sequence 1. Since the rotation is static, the rotation logic 234 can be eliminated in another embodiment by hard-wiring the inputs to multiplexer 233. By programming the pre-rotation coefficient ROMs in the correct order, no special logic is required to address them. Rather, the pre-rotation coefficient ROMs are controlled directly from counter bits $b_0 \ldots b_{n-2}$.

Figure 11:
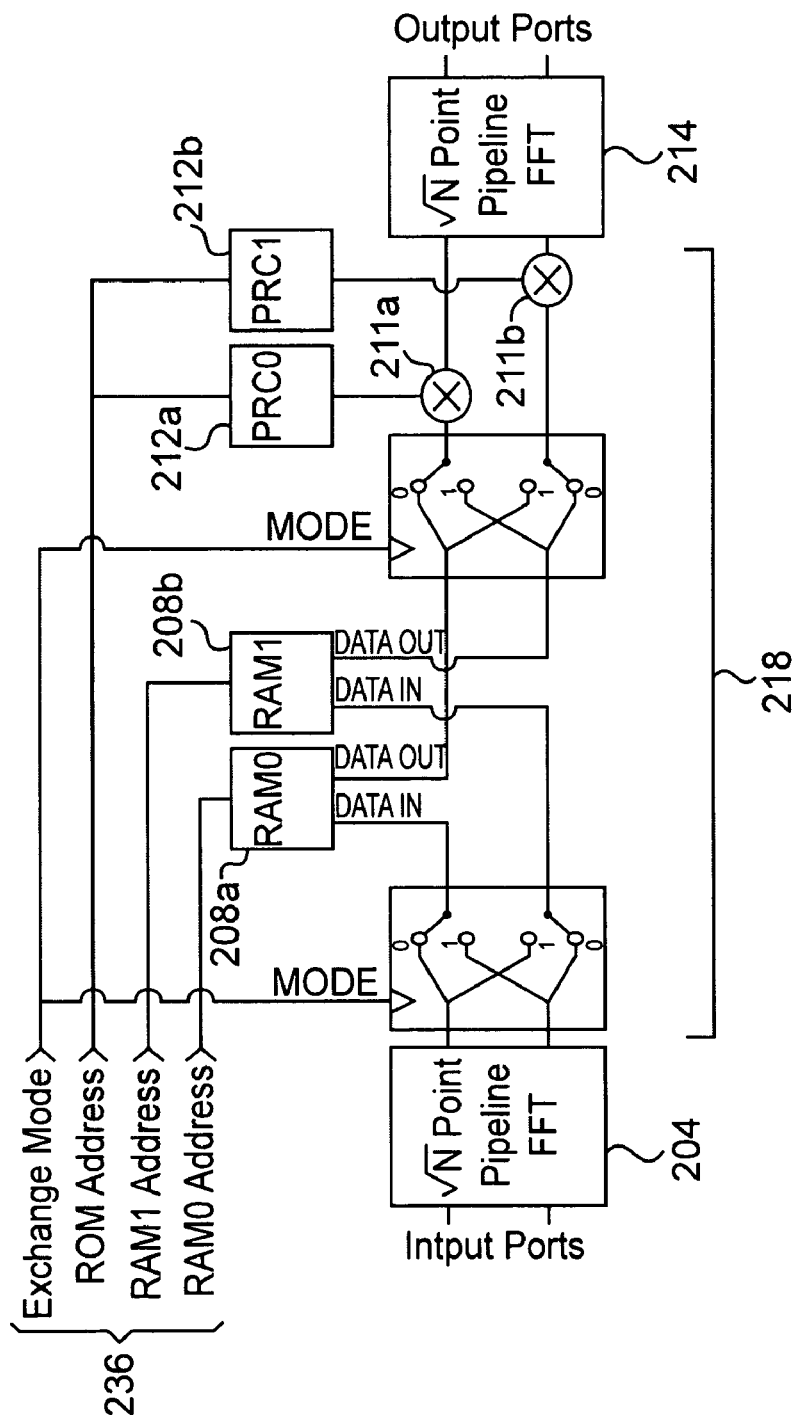
FIG. 11 is a block diagram of a radix-2 modular pipeline FFT.

FIG. 11 shows a diagram of the full radix-2 pipeline, including the address lines 236 from center address generator 230 of FIG. 10, first stage pipeline FFT module 204, second stage pipeline FFT module 24, data exchangers 206 and 207, memories 208a and 208b, multipliers 211a and 211b, and pre-rotation coefficient ROMs 212a and 212b.

Figure 12:
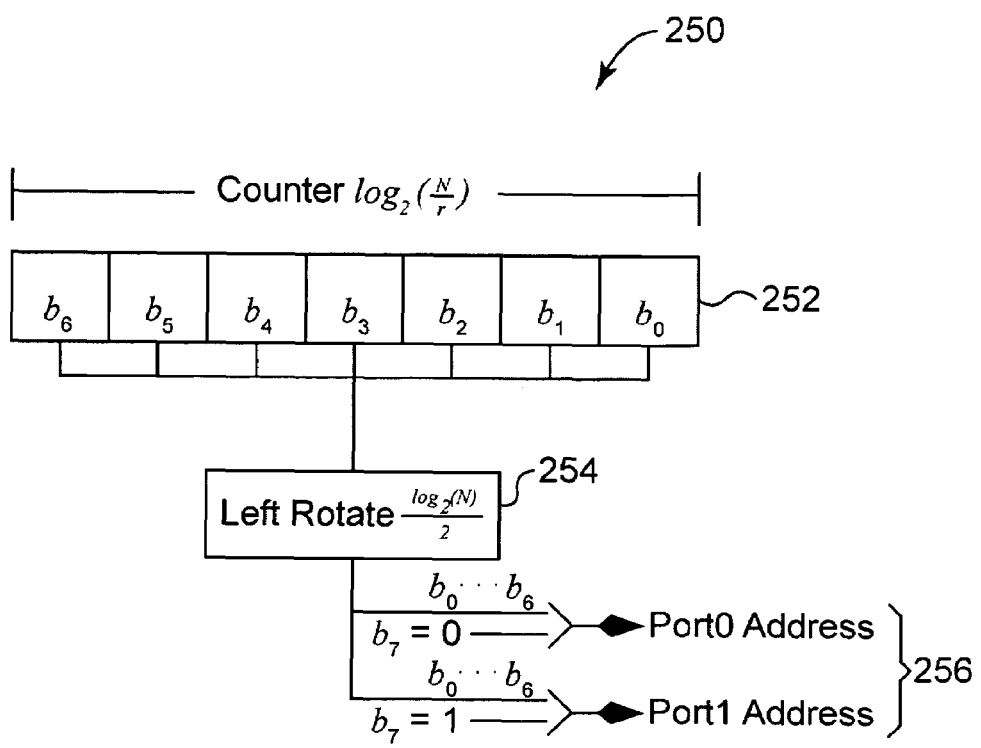
FIG. 12 shows a radix-2 modular pipeline FFT input address generation logic.
Figure 13:
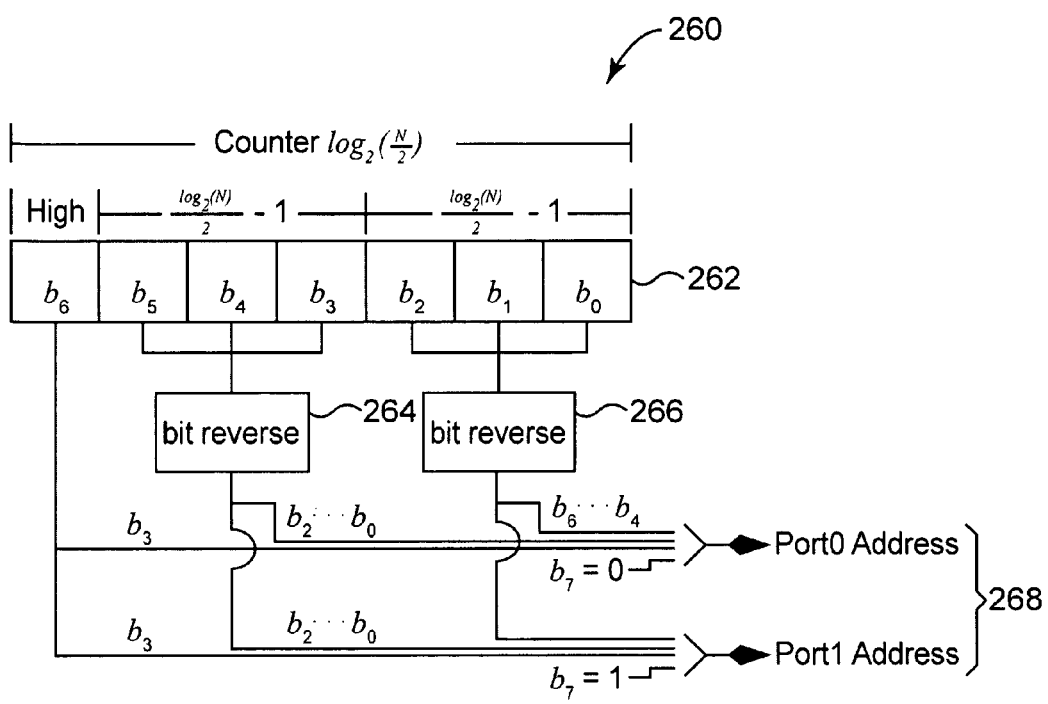
FIG. 13 shows a radix-2 modular pipeline FFT output address generation logic.

As mentioned previously, the module pipeline FFT may also include input and output memory address generators. FIG. 12 shows a diagram of an input address generator 250. Input address generator 250 includes a counter 252 and left rotate logic 254. Input address generator 250 creates memory addresses to access the input data. The input is assumed stored in memory in time order. That is, the input data is expected in memory in the same way a conventional DIT pipeline FFT would expect the data. In another embodiment, left rotate logic 254 may be replaced by a hardwired address bus. The port addresses 256, Port0 and Port1 differ only in the most significant bit (MSB). Namely, for Port0 the MSB $b_7=0$, while for Port 1, the MSB $b_7=1$. FIG. 13 shows a diagram of an output address generator 260, including counter 262, bit reverse logic 264 and bit reverse logic 266. Output address generator 260 outputs the resulting port addresses 268.

As described above, input (FIG. 12), output (FIG. 13), and center address generators (FIG. 10) are all counter based. The center address generator 230 requires the widest counter to accommodate the sequence bit. All the address generation logic can run from a single counter. However, the conventional pipeline delay must be taken into account. For instance, given a 256 point pipeline, each stage is 16 points. Therefore, each conventional pipeline module requires 4 radix-2 stages. The total time required to compute the 16 point FFT is 7 clocks. As a result, offsetting the input, center, and output address generators by log2 (N)–1 clocks allows them all to be driven from a single counter.

Figure 15:
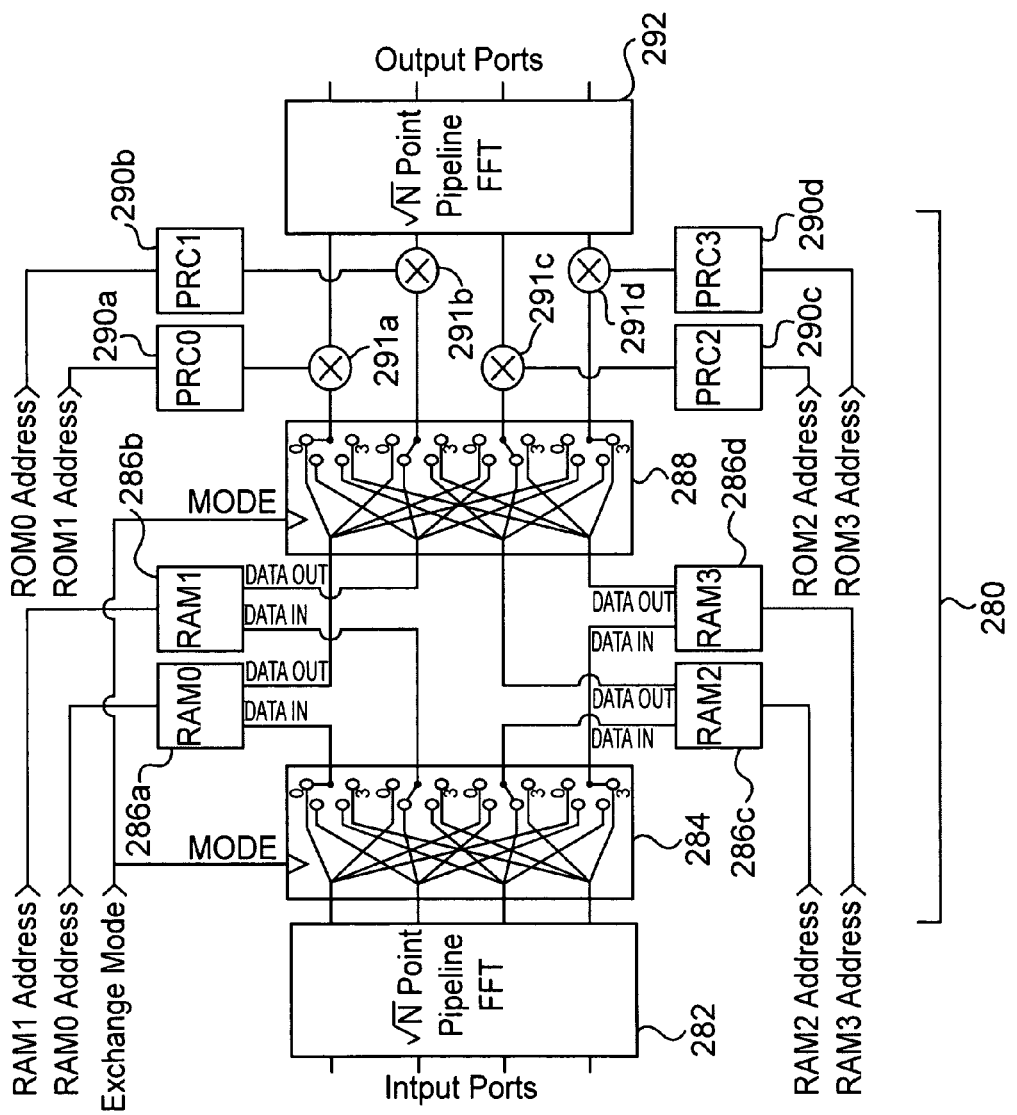
FIG. 15 is a block diagram of a radix-4 modular pipeline FFT.

FIG. 15 shows a block diagram of a radix-4 modular pipeline FFT 281. The radix-4 modular pipeline FFT architecture 281 shown in FIG. 15 may have a similar configuration and components as the radix-2 modular pipeline FFT described above. In this embodiment, center element 280 includes four data memories 286a-286d, four pre-rotation coefficient ROMs 290a-290d, and four multipliers 291a-291d. Data exchangers 284 and 288 have four modes of operation.

Figure 14:
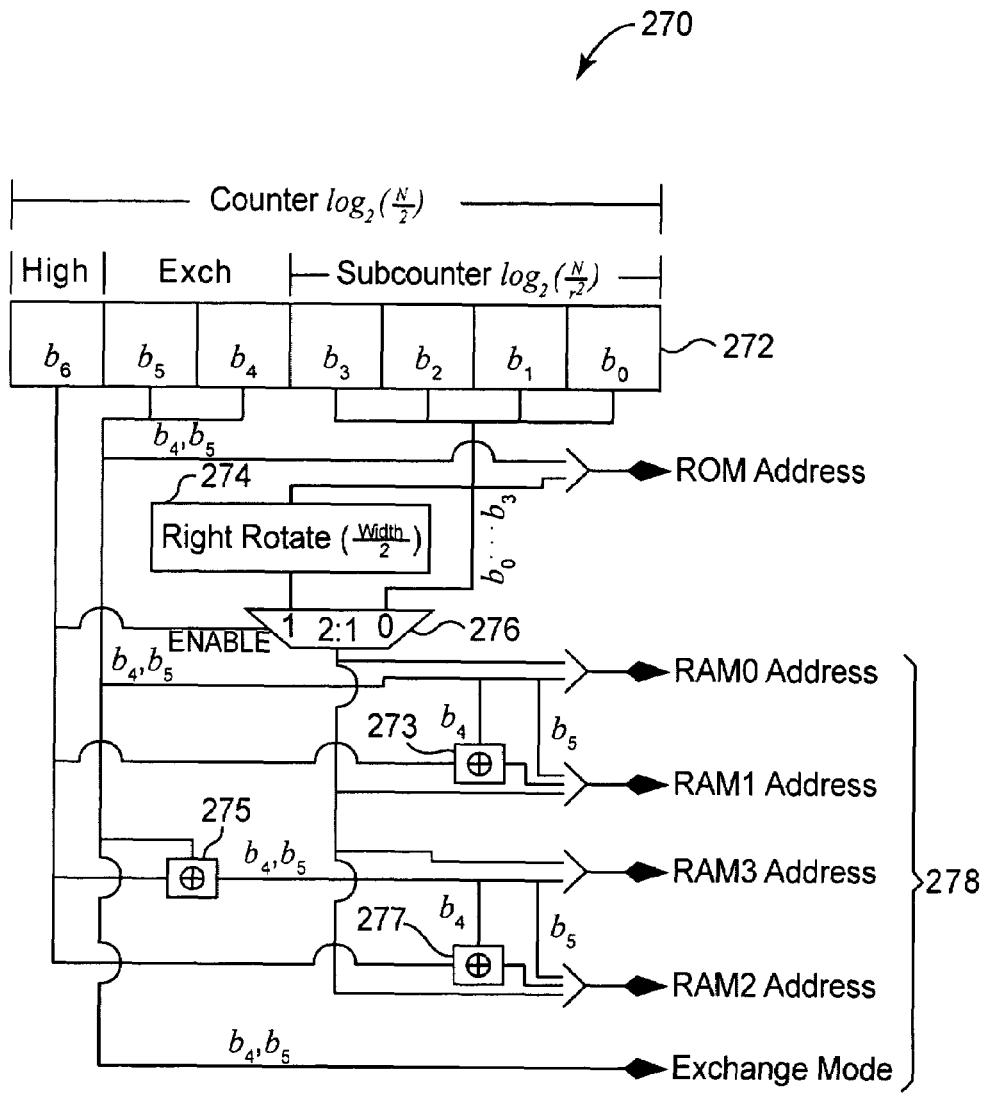
FIG. 14 shows a radix-4 modular pipeline FFT center address generation logic.

The address generator for the radix-4 architecture is composed of input and output address generators-as well as a center address generator. FIG. 14 shows a diagram of an example center address generation logic 270 for a radix-4 module pipeline FFT. The example center address generation logic 270 shown in FIG. 14 is for a 256 point radix-4 FFT are shown in the diagram. Center address generator 270 is controlled by a single counter 272 of width log2 (N/2). As in the radix-2 center address generator, the subcounter is rotated by one-half the width. This rotation is static, so it may be replaced by hardwiring the inputs to multiplexer 276. During the first address sequence, each memory 286a-286d (see FIG. 15, which shows a block diagram of a radix-4 modular pipeline FFT) is partitioned into r sections. Each memory has only one section active and no two memories simultaneously access the same section. During the second sequence, each memory address differs by the "Exch" bits, bits $b_4$, $b_5$. The RAM3 address is computed by inverting bits $b_4$ and $b_5$ of the RAM0 address. The RAM1 address inverts bit $b_4$ of the RAM0 address. The RAM2 address inverts only bit $b_5$ of the RAM0 address. Note that in this diagram, bit $b_4$ is inverted twice. By so programming the pre-rotation coefficient ROMs, the ROMs are all accessed in order directly from the address counter. As in the radix-2 system, the top bit, the "High" bit ($b_6$ in this example) controls which address sequence is active.

The outputs 278 of radix-4 center address generator 270 also controls the data exchangers 284 and 288 (see FIG. 15). In this radix-4 embodiment, center address generator 270 requires two bits for the data exchanger since it must select one of four modes. In a 256 point transform, bits $b_4$ and $b_5$ control the data exchangers which toggle four times per transform (see FIG. 14).

Figure 16:
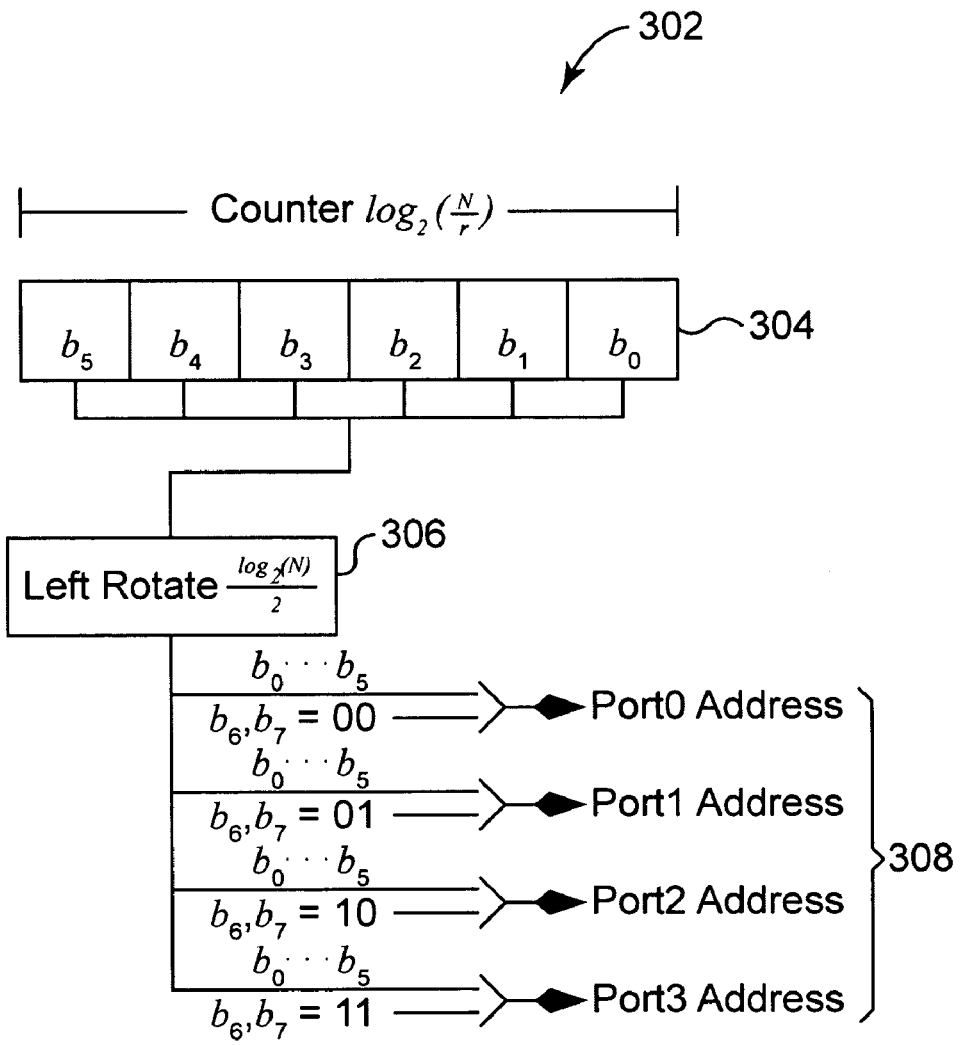
FIG. 16 shows a radix-4 modular pipeline FFT input address generation logic.

FIG. 16 shows a diagram of radix-4 input address generation logic 302. Input address generation logic includes a counter 302 and left rotate logic 306. The input is assumed in memory. Four points are accessed per clock cycle. Although this diagram shows a left rotator 306, this component may be eliminated in alternative embodiments. Without the rotator, the input address generator does not require any logic. To form the outputs 308, the counter bits form the lower portion of the input addresses. The upper portion is formed from the port number.

Figure 17:
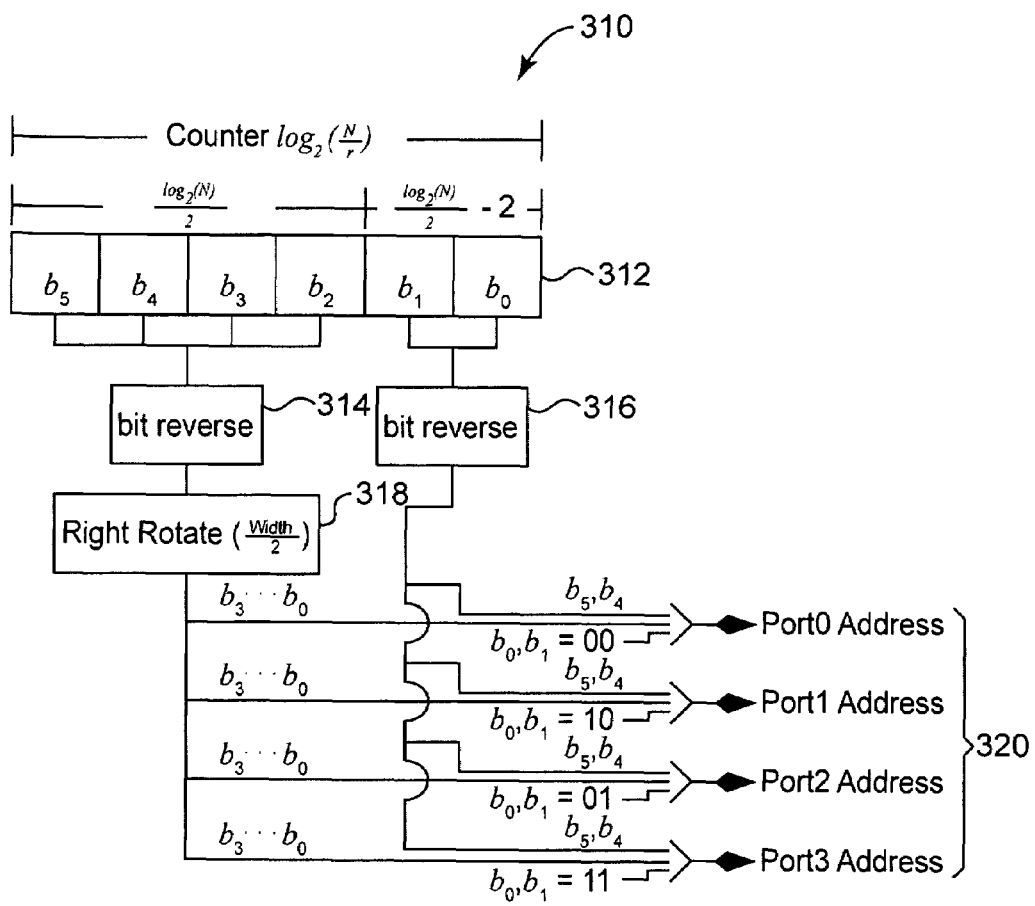
FIG. 17 shows a radix-4 modular pipeline FFT output address generation logic.

As with the radix-2 architecture, the radix-4 architecture also may include an output address generator. FIG. 17 shows a diagram of a radix-4 modular pipeline FFT output address generation logic 310. Output address generation logic 310 includes a counter 312, bit reverse logic 314 and 316, and right rotate logic 318. Output address generation logic 310 outputs port addresses 320.

Both the radix-2 and radix-4 pipeline architectures address the pre-rotation coefficients directly. The proper pre-rotation coefficient sequence should therefore initially be programmed into the ROMs. An example MATLAB code listing to generate the coefficients for both architectures is given in Listing 2. The output is an array with the memory address in the first column, followed by the real and imaginary component for each memory.

---

Listing 2: MATLAB Code to Generate Pre-Rotation Coefficients

```
1  function mem=modular_pipeline_coeff(points, radix );
2  points_per_group = sqrt(points );
3  number_groups = sqrt(points );
4  for counter=0:( points/radix)-1;
5      group_id_base = bitshift (counter *
           radix, -log2(number_groups));
6      if points_per_group == radix
7          group_id = bitwise_reverse
               (group_id_base,log2(number_groups));
8      else
9          bit_mask = bitcmp(0,log2(points_per_group/radix ));
10         top = bitand(group_id_base, number_groups/radix);
11         bot = bitwise_reverse (bitand(group_id_base, bit_mask ),...
12             log2(points_per_group/radix ));
13         group_id = bitor(top,bot);
14     end;
15     base_sample_id = mod(counter, (points_per_group/radix ));
16     % write the memory address to the array
17     mem(counter+1,1) = counter;
18     % compute the coefficient for each memory
19     for targ_mem=0:(radix-1);
20         sample_mod = bitshift(targ_mem,
               log2(points_per_group/radix ));
21         sample_id = bitor(base_sample_id, sample_mod);
22         % compute the coefficient integer
23         coeff = group_id * sample_id;
24         % Real and Imag into distinct memories
25         real_p = cos(-2*pi*coeff/points );
26         imag_p = sin(-2*pi*coeff/points );
27         % -R = Real, -I = Imaginary
28         % Memory = [ Address Mem0(Re)
               Mem0(Im) Mem1(Re) Mem1(Im) ]
29         mem(counter+1,2*targ_mem+2:2*targ_mem+3)=
               [ real_p imag_p ];
30     end;
31 end;
32
33 function kp=bitwise_reverse(k,w);
34 k = fliplr (dec2bin(k));
35 s = length(k);
36 kp = bin2dec(k) * 2^(w-s);
```

---

In the modular pipeline FFT, the second data exchanger occurs prior to the pre-rotation multiplication. The reason for this arrangement is as follows. In many signal processing applications, the input data is windowed prior to the FFT. Windowing the input requires a multiplication of each input point by a window coefficient. If the pre-rotation multipliers are coupled with the conventional pipeline FFT into a single module, this module may be replicated in the first stage. These first stage multipliers may then be used to window the input data by simply replacing pre-rotation coefficients with windowing coefficients.

Figure 18:
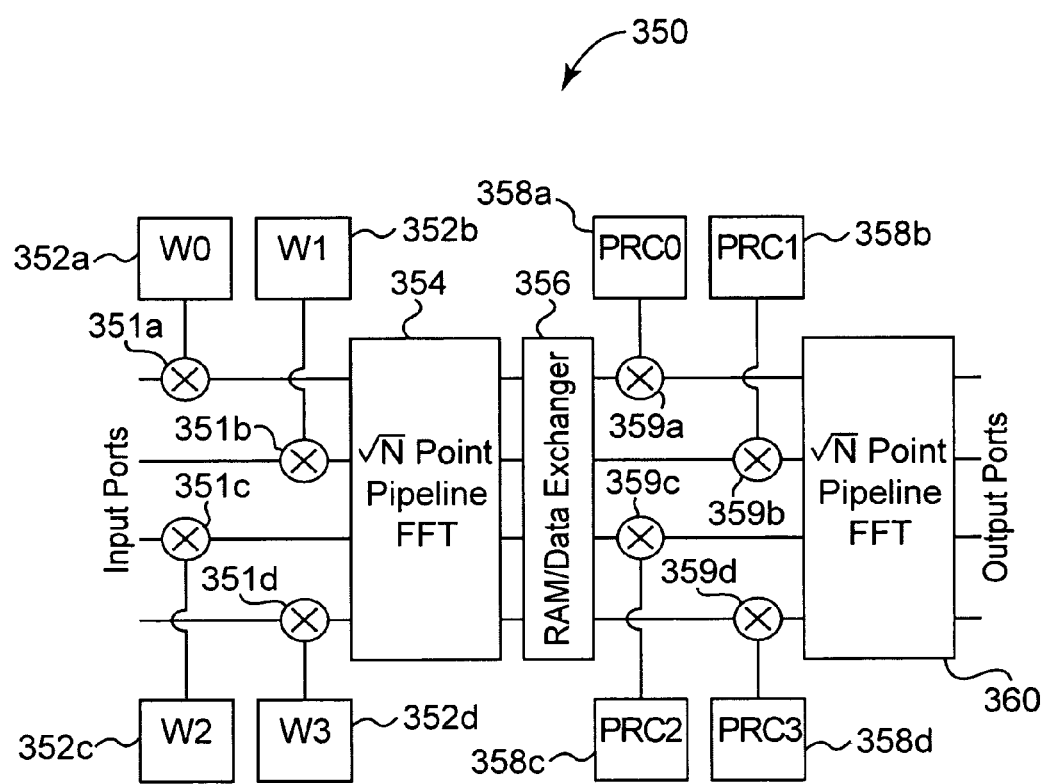
FIG. 18 shows a windowing configuration for the modular pipeline FFT.

FIG. 18 shows a diagram of a windowing configuration 350 for the modular pipeline FFT. This embodiment includes first and second stage pipeline FFT modules 354 and 360, RAM/data exchanger 356, pre-rotation coefficient storage 358a-358d and multipliers 359a-359d. These elements are replicated in the first stage to create windowing coefficient storage 352a-352d and multipliers 351a-351d.

The modular pipeline represents an efficient architecture for computing FFTs. In particular, it facilitates the computation of long FFTs that usually require prohibitively complex hardware. The length of the delay lines and coefficient memory depth increase linearly with N point in a conventional pipeline FFT. The modular pipeline FFT replaces an N point conventional pipeline with two $\sqrt{N}$ point pipelines. Thus, it is able to "collect" the delay lines in the center element. The total length of the delay lines and the number of distributed coefficients are reduced to approximately $\sqrt{N}$.

A hardware design typically reuses many identical components. A conventional pipeline FFT does not fit this model well. Each cell in the pipeline has unique memory and coefficient requirements. A single, reusable cell must contain the maximum amount of memory and coefficient space that will be needed for a given length transform. This results in an efficient design. The modular pipeline FFT facilitates "design-for-reuse." Each of the conventional pipeline modules is identical. Further, each pipeline module for the modular pipeline FFT may be composed of identical cells with much higher efficiency than the conventional pipeline because the length of each module is much shorter.

Fundamentally, the modular pipeline computes an N point FFT by combining a series of $\sqrt{N}$ point transforms. The architecture couples two pipeline FFT modules with a center element. The center element contains data and coefficient memory as well as a pair of r port data exchangers. In addition, the center element provides an adjustment for the data prior to the second pipeline module. Address generators in the center element prevent data collisions between incoming and outgoing data while limiting the amount of center element memory require to N. Rather than several series of delay lines, a set of memories is used.

The embodiments described for the radix-2 and radix-4 modular pipelines demonstrate the simplicity of the required center element control logic. The address and control logic is composed of a counter, a hardwired multiplexer and a handful of simple gates. Furthermore, the design of the address and control logic is flexible. Each address generator may be driven by an independent counter, or they may be coupled and run from a single counter. The pre-rotation coefficients are stored in a special center element ROM and addressed directly. The coefficient ordering is handled in the ROM programming sequence.

Evaluation of the hardware and time complexity demonstrated that the modular pipeline FFT significantly reduces the amount of distributed coefficient storage and the total length of delay lines in each pipeline module over conventional FFTs. In some cases, the reduction exceeded 2 orders of magnitude for a given FFT length. Replicating each of the pipeline cells leads to a non-optimal implementation in that certain delay elements and coefficients are unused. Longer pipelines lead to larger cells and lower efficiency. Since the modular pipeline reduces the delay length in each module, the efficiency increases. In many cases, the efficiency of the modular pipeline more than doubled that of the conventional pipeline. In an optimized modular pipeline, a single additional multiplier is needed. In the non-optimized version, r additional multipliers are needed. The extra multipliers are used for pre-rotation. Adding another coefficient memory allows the first pipeline to window the data with its unused multipliers.

Modular pipeline FFTs maintain the throughput of the conventional pipeline FFT. A radix-r pipeline inputs and outputs r points per clock cycle. Therefore, there is no impact on the aggregate data bandwidth of the system. The data latency is however slightly higher and increases proportionately to $\sqrt{N}$.

The modular pipeline FFT may also reduce the power consumed by the system. A conventional FFT has a long series of delay elements. Statistically, on each clock cycle, one-half of the bits are expected to change state resulting in some dynamic power consumption. The modular pipeline toggles $\sqrt{N}$ delay line bits. In addition, a constant number (r) of memory words are read and written in the center memories. In effect, the number of bit changes per clock has been reduced from $$\frac{N}{2}$$

to $\sqrt{N}$, a substantial savings in dynamic power.

The modular pipeline FFT provides identical bandwidth to a conventional FFT with slightly higher latency, very simple control hardware, and a tremendous reduction in the hardware complexity. The only additional component is a center element which contains data and pre-rotation coefficient memories. In all cases, a non-optimized modular pipeline still had significantly less hardware than even the fully optimized conventional pipeline. Component reuse is encouraged by the use of identical conventional pipeline modules. Since the storage is concentrated in a set of center RAMs and ROMs, the design is also suited to custom and programmable hardware. Total power consumption is decreased because pipeline delay elements are replaced by memory.

In conclusion, the modular pipeline FFT has enhanced the conventional pipeline by combining it with a specialized center element. The result is almost a drop-in-replacement pipeline FFT that facilitates the computation of very long transforms while still increasing the hardware efficiency for small FFTs.

Various embodiments of the invention have been described. These embodiments are illustrative of the practice of the invention. Various modifications may be made without departing from the scope of the claims.

The invention claimed is:

1. A device, comprising:
    a first FFT unit that performs a first fast Fourier transform (FFT) on a set of inputs to produce intermediate values;
    center element logic that multiplies the intermediate values by pre-rotation coefficients to produce pre-rotated intermediate values, wherein the pre-rotated intermediate values are organized into first groups, and reorganizes the pre-rotated intermediate values into new groups, each new group containing one of the intermediate values from each of the first groups; and
    a second FFT unit that performs a second fast Fourier transform on the reorganized pre-rotated intermediate values to produce a set of outputs.

2. A device, comprising:
    a first FFT unit that performs a first fast Fourier transform (FFT) on a set of N inputs to produce N intermediate values;
    center element logic that multiplies the N intermediate values by a set of N pre-rotation coefficients to produce N pre-rotated intermediate values organized into $\sqrt{N}$ new groups, each new group containing one of the N intermediate values from each of the $\sqrt{N}$ first groups; and
    a second FFT unit that performs a second fast Fourier transform (FFT) on the set of N reorganized pre-rotated values to produce N outputs.

3. A system, comprising:
    a first stage that performs a first fast Fourier transform (FFT) on a set of inputs to produce intermediate values;
    a center stage that performs a pre-rotation of the intermediate values; and
    a second stage that performs a second fast Fourier transform on the pre-rotated intermediate values to produce a set of outputs.

4. The system of claim 3, wherein the center stage multiplies the intermediate values by pre-rotation coefficients to produce pre-rotated intermediate values.

5. The system of claim 4, wherein the pre-rotated intermediate values are organized into first groups, and wherein the center stage further reorganizes the pre-rotated intermediate values into new groups, each new group containing one of the intermediate values from each of the first groups.

6. The system of claim 3, wherein the first stage and the second stage are implemented using identical hardware.

7. The system of claim 3, wherein to perform an N point transform, a set of N inputs are organized into $\sqrt{N}$ groups, and wherein the first stage performs $\sqrt{N}$ transforms on the set of N inputs to produce N intermediate values.

8. The system of claim 7, wherein the N intermediate values are organized into $\sqrt{N}$ new groups, each new group containing one of the N intermediate values from each of the $\sqrt{N}$ intermediate groups.

9. The system of claim 8, wherein the second stage performs $\sqrt{N}$ transforms on the set of N intermediate values to produce the N outputs.

10. The system of claim 3 wherein the pre-rotation is a multiplication of the intermediate values by pre-rotation coefficients.

11. The system of claim 3, wherein the center stage includes data memory.

12. The system of claim 11, wherein all of the first stage FFT's are performed and stored in the data memory before the second stage FFT's are performed.

13. The system of claim 3, wherein the center stage includes pre-rotation coefficient memory that stores the pre-rotation coefficients.

14. The system of claim 3, wherein the center stage multiplies the intermediate values by pre-rotation coefficients to produce pre-rotated intermediate values, and wherein the pre-rotation coefficients are defined by $$W_N^k = e^{-j2\pi \frac{k}{N}},$$

where $W_N^k$ is the pre-rotation coefficient, N is the number of points in the fast Fourier transform, and $0 \leq k \leq N-1$.

15. The system of claim 3, wherein an equation by which the first stage, center stage, and third stage perform an N point fast Fourier transform is given by:

$$X(\sqrt{N} k_1 + k_0) = \sum_{m_0=0}^{\sqrt{N}-1} W_N^{m_0 k_0} \left( \left( \sum_{m_1=0}^{\sqrt{N}-1} x(\sqrt{N} m_1 + m_0) W_{\sqrt{N}}^{m_1 k_0} \right) W_{\sqrt{N}}^{m_0 k_1} \right)$$

$$= \sum_{m_0=0}^{\sqrt{N}-1} \sum_{m_1=0}^{\sqrt{N}-1} x(\sqrt{N} m_1 + m_0) W_{\sqrt{N}}^{m_1 k_0} W_{\sqrt{N}}^{m_0 k_1} W_N^{m_0 k_0}$$

$$= \sum_{m_0=0}^{\sqrt{N}-1} \sum_{m_1=0}^{\sqrt{N}-1} x(\sqrt{N} m_1 + m_0) W_N^{m_1 k_0 \sqrt{N}} W_N^{m_0 k_1 \sqrt{N}} W_N^{m_0 k_0}$$

$$= \sum_{m_0=0}^{\sqrt{N}-1} \sum_{m_1=0}^{\sqrt{N}-1} x(\sqrt{N} m_1 + m_0) W_N^{m_1 k_0 \sqrt{N} + m_0 k_1 \sqrt{N} + m_0 k_0}$$

$$0 \leq k_0, k_1 \leq \sqrt{N} - 1,$$

where $W_N^k$ is the pre-rotation coefficient, N is the number of points in the fast Fourier transform, and $0 \leq k \leq N-1$.

* * * * *

UNITED STATES PATENT AND TRADEMARK OFFICE
CERTIFICATE OF CORRECTION

PATENT NO. : 7,543,010 B2 Page 1 of 1
APPLICATION NO. : 10/979775
DATED : June 2, 2009
INVENTOR(S) : Swartzlander, Jr. et al.

It is certified that error appears in the above-identified patent and that said Letters Patent is hereby corrected as shown below:

Column 5, line 62, "A 16 point MATLAB example is n in Listing 1"
should read -- A 16 point MATLAB example is given in Listing 1 --

Column 6, lines 33-34, "X(1+M*k1+k0) = X(1+M*k1+k0)...+
X(1 + M*m1+m0), *"
should read -- X(1+M*k1+k0) = X(1+M*k1+k0)...
+ x(1 + M*m1+m0), * --

Column 12, line 21, "Given a radix-4 pipeline,"
should read -- Given a radix-r pipeline, --

Signed and Sealed this

Twenty-fourth Day of August, 2010

David J. Kappos
*Director of the United States Patent and Trademark Office*